INVENTORS
JOHN KEEBLE
EDWARD IEIAN MORGAN
BY
ATTORNEYS

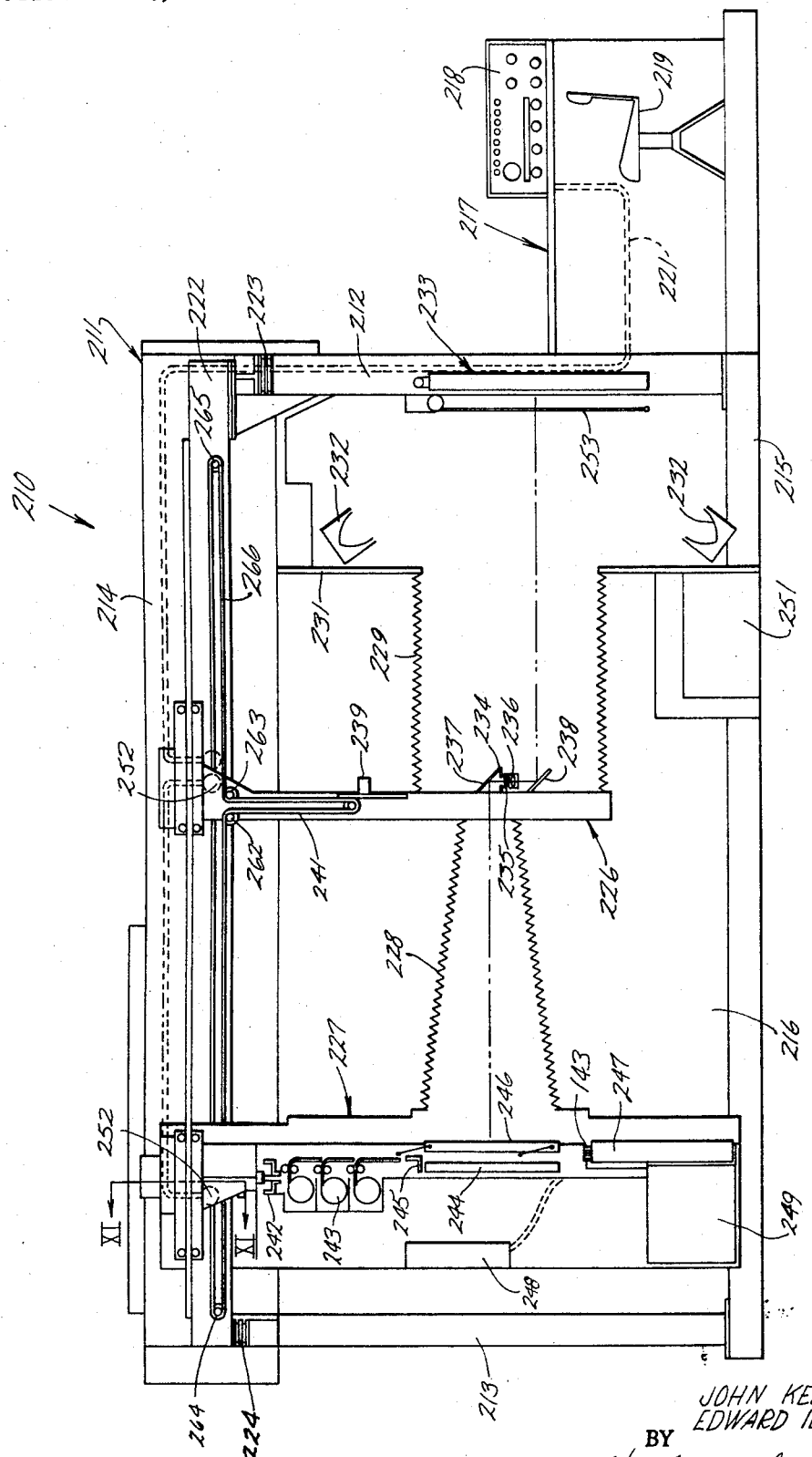

May 30, 1972   J. KEEBLE ET AL   3,666,366
REPRODUCTION CAMERA
Filed Dec. 5, 1969   22 Sheets-Sheet 3
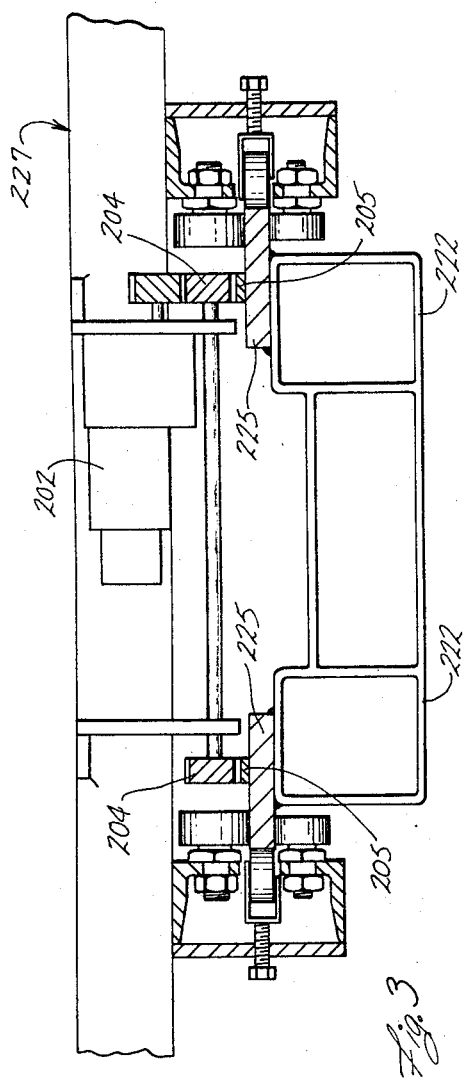
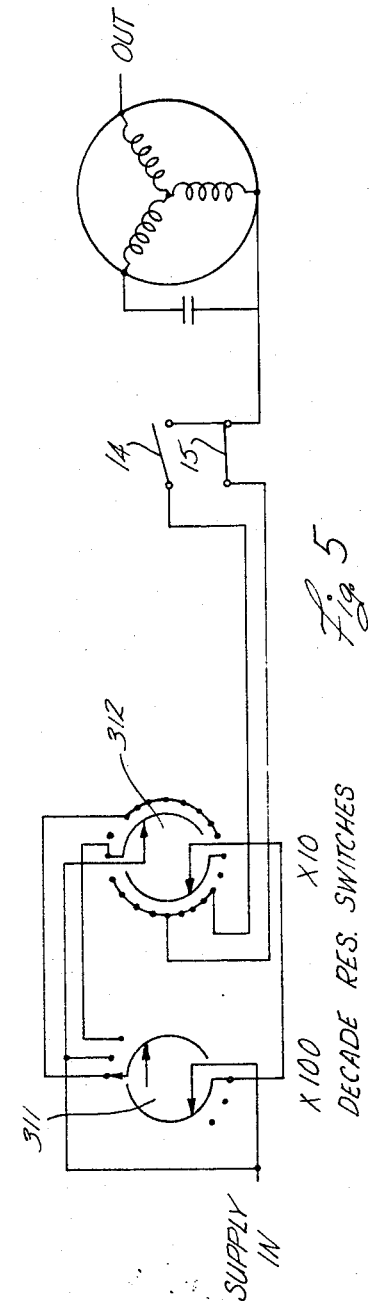
INVENTORS
JOHN KEEBLE
EDWARD IEIAN MORGAN
BY
Woodhams, Blanchard & Flynn
ATTORNEYS

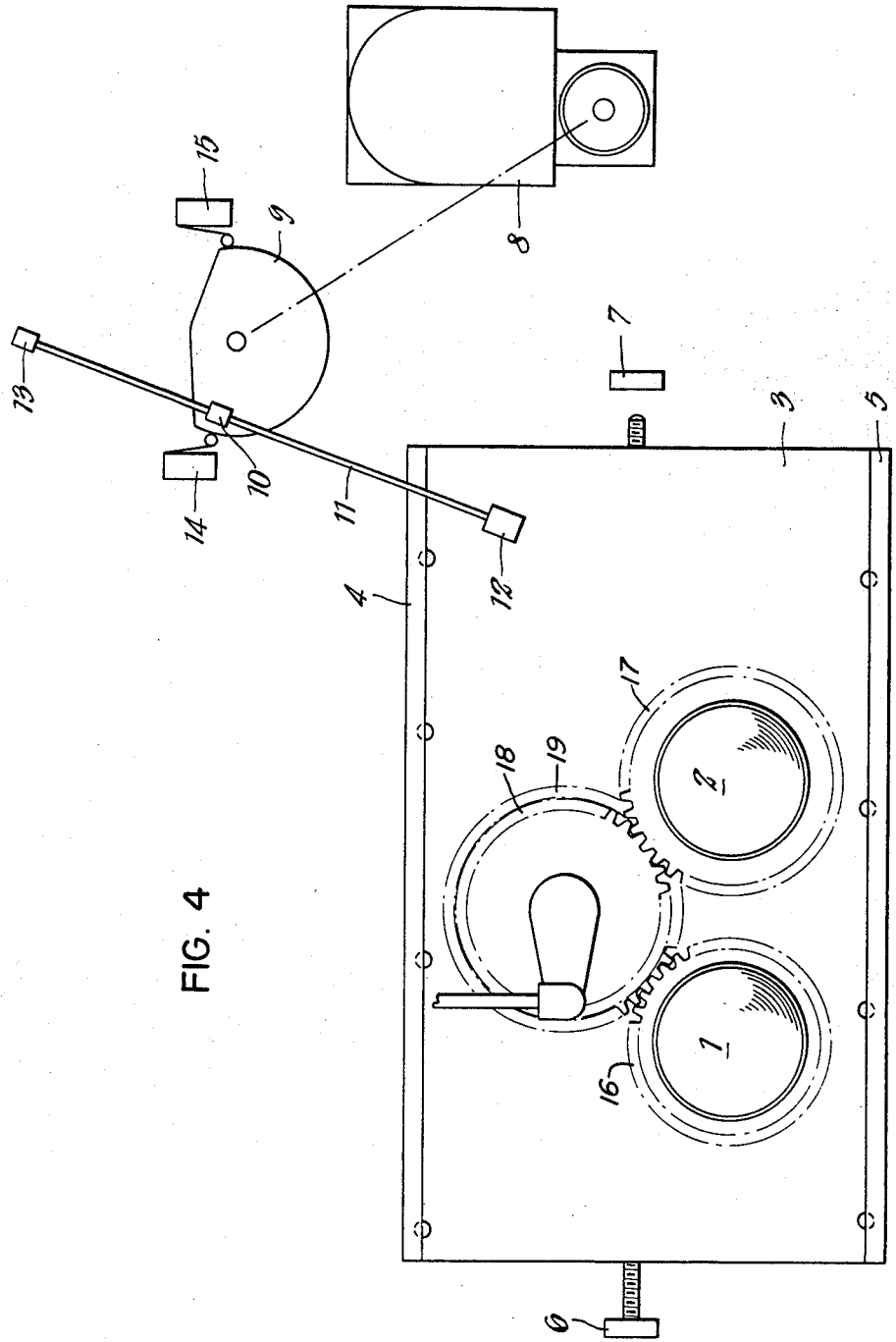

May 30, 1972   J. KEEBLE ET AL   3,666,366
REPRODUCTION CAMERA

Filed Dec. 5, 1969   22 Sheets-Sheet 5

INVENTORS
JOHN KEEBLE
EDWARD IEIAN MORGAN
BY
Woodhams, Blanchard & Flynn
ATTORNEYS

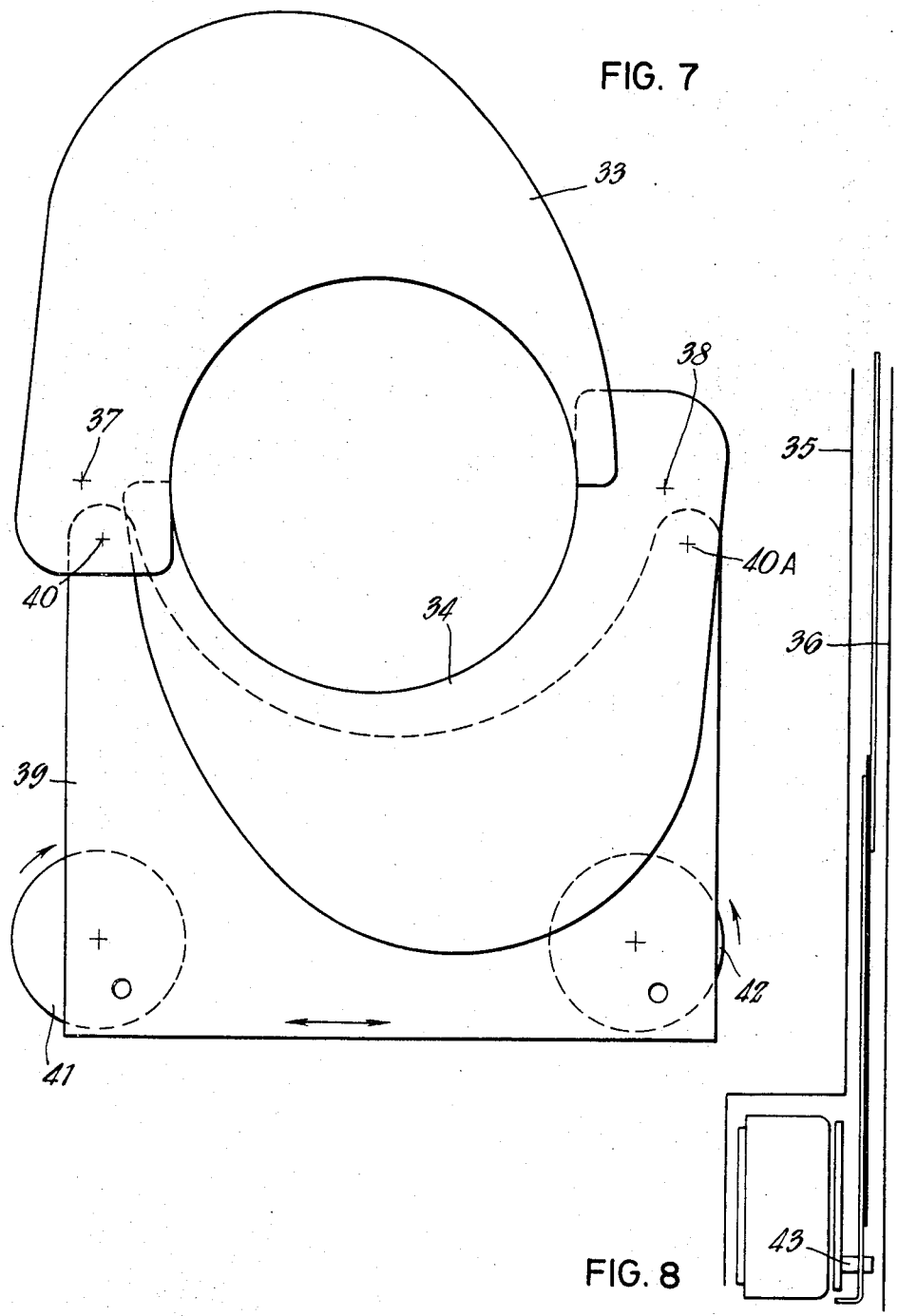

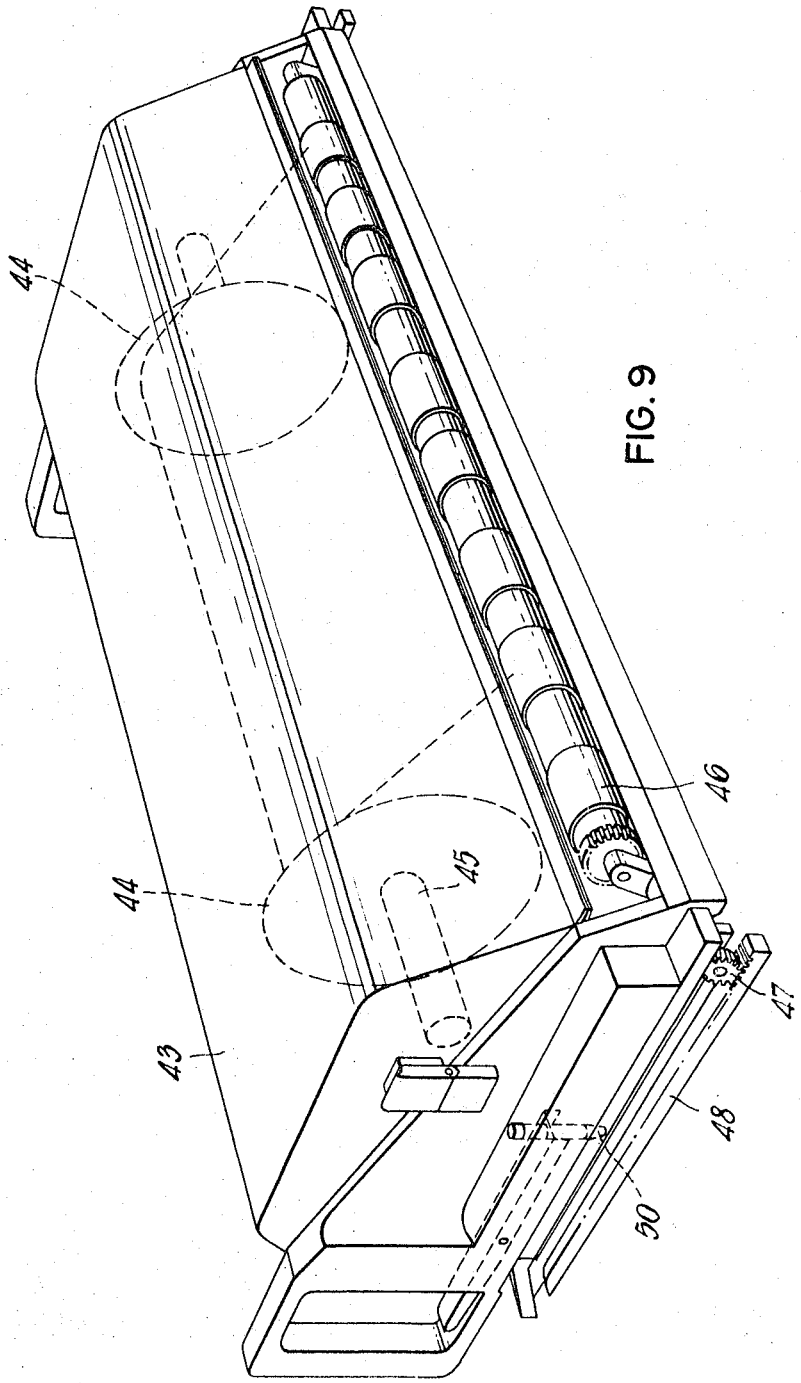

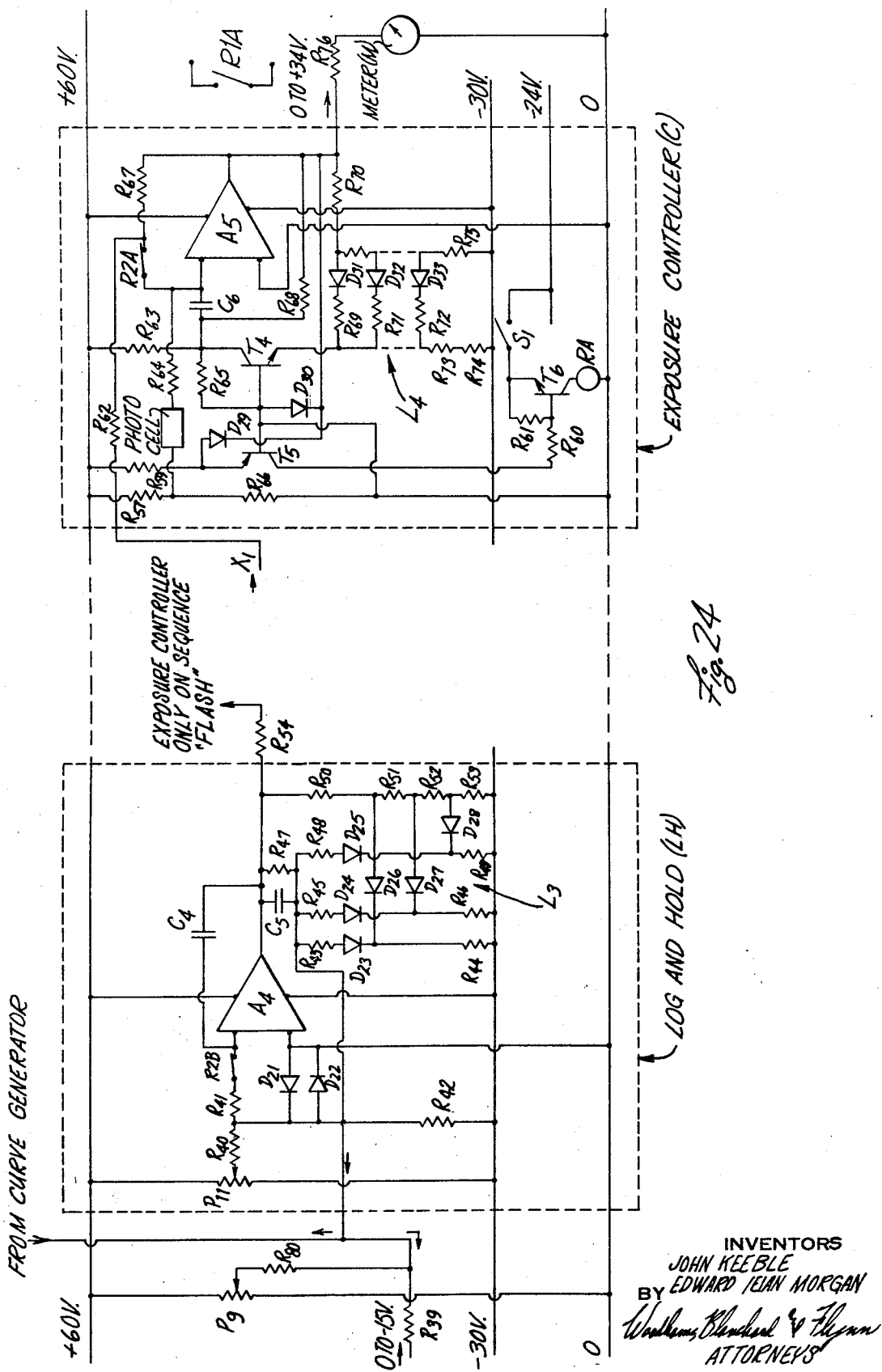

United States Patent Office 3,666,366
Patented May 30, 1972

3,666,366
REPRODUCTION CAMERA
John Keeble, Ashlong Grove, and Edward Ieian Morgan, Ingrave, England, assignors to Sidney R. Littlejohn & Company Limited, London, England
Continuation-in-part of abandoned application Ser. No. 671,254, Sept. 28, 1967. This application Dec. 5, 1969, Ser. No. 882,611
Claims priority, application Great Britain, Nov. 19, 1969, 56,681/69
Int. Cl. G03b 27/76
U.S. Cl. 355—56
20 Claims

ABSTRACT OF THE DISCLOSURE

A reproduction camera having a stationary copy-holder and independently movable lens and film carriages in which operation of the camera is controlled by an operator without moving from a control position and all the camera variables are selected and set under computer control and all the photographic operations are controlled by automatically operated sequence control means to achieve an end product having predetermined photographic characteristics.

CROSS-REFERENCE TO RELATED APPLICATION

This application is a continuation-in-part of my copending application Ser. No. 671,254, filed Sept. 28, 1967, now abandoned, and entitled "Reproduction Camera."

The invention relates to photographic reproduction cameras.

A principal object of the invention is to provide a reproduction camera which may be used as a studio camera or may be built into a dark room in which all of the controls are positioned near the copy holder and in which the camera may be loaded and operated without the operator moving from the control position. This is made possible by employing a stationary copy holder with the camera variables, for example the lens focusing mechanism, the lens diameter adjusting mechanism, and the means for selecting the particular lens to be used, being automatically adjusted by means of a computer, and the various stages of the photographing operation being controlled by sequence control means.

It is a further object of the invention to control automatically after commencement of operation the variables which determine the final quality of the reproduction.

It is still a further object of the invention to provide a camera using roll film and capable of fast monochromatic production with ease of operation so that operator skill and fatigue are reduced to a minimum.

According to the invention there is provided a reproduction camera having a stationary copy holder and a lens carriage and a film carriage each movable independently and relative to the copy holder.

The camera preferably comprises an overhead generally horizontal beam supported on anti-vibration mountings and carrying a fixed copy holder frame at the one end and a movable lens carriage and film carriage which are positioned remotely from the control panel at the operator position.

The camera of the invention is able to produce negatives for different processes, e.g. line, half tone using contact or glass engraved screens, and continuous tone.

From the copy holder frame and extending sideways and to the rear is a chamber in which are positioned the lamps for illumination of the copy and also a vacuum pump. This chamber is light tight and ventilated and has access doors to facilitate the maintenance of lamps, pump and lenses.

Immediately to the rear of the lamp compartment is located the lens carriage which is supported on rollers from the overhead track and is able to move along the track driven by a motorized drive. Between the lens carriage and the light compartment is an extendable bellows unit which embraces the lenses and seals the lamp compartment to the lens carriage.

To the rear of the lens carriage is the film carriage which is also suspended on rollers from the overhead track and is able to move along the track driven by a motorized drive. Connecting the lens and film carriages is an extendable bellows unit which encloses the optical path with a light tight cover.

The copy holder comprises a frame which is free to rotate about a horizontal axis at its balance point. This frame can be moved to the horizontal position when loading the copy and to the vertical position when an exposure is taking place. The frame is retained in either position by a spring loaded damper which acts as a control medium to prevent shock loads on the assembly and remove from the operator the need for careful positioning. The copy is loaded on to a spring board in the copy frame and is retained by a hinged glass lid. This lid is counterbalanced to reduce operator fatigue and has interlocking catches to prevent incorrect operation.

The moving lens and film carriages are positioned according to the conjugate focus required by means of an electrical analogue focusing system. Variation of focal length and magnification are used to produce voltages proportional to the positions of the lens and film relative to the copy. These voltages are used to drive the carriage positioning motors.

Control of the exposure time is obtained from an electronic controller where the variables of copy density, copy contrast, negative requirements, film emulsion characteristics, aperture ratio and screen factors are preprogrammed and light intensity is obtained automatically from transducers. From this information the exposure controller provides signals which control the exposure times required to produce the different negatives.

All controls, amplifiers and power units are located in a control console situated at the side of the operator's position. The main selection controls for magnification, film size and cutting, negative type and screens, and contrast trimmers are located in a panel on the console and the main electronic equipment is carried on rack modules within the console.

The console also has a control panel which carries the trimming controls for film emulsion variation, screen contrast, illumination trimming controls and manual setting controls for exposure should this be required under special circumstances.

At the top and to each side of the controlling position is a work support sloped at an angle to the horizontal where copy can be rested before and after exposure.

To enable a high production rate the copy is evaluated prior to reaching the camera. Values for density and contrast of the copy are established and the magnification and type and size of the negative are decided. This information is noted on a program docket which is attached to the copy so that it may easily be read by the operator. On receipt of the copy and docket the operator is able to set the required magnification, the width and length of the film required, the cutting of the film, the type of negative required and the selection of the required screen.

All the camera operations of feeding film, film cutting and positioning of the screens are carried out automatically and sequentially, and exposures are controlled from the electronic controller which operates from information of copy density, copy contrast, illumination intensity and negative type.

The lamp chamber is positioned between the lens carriage and the copy holder so that the camera may be used as a studio or gallery model or may be built into a dark room.

When the camera is used as a studio model a drawer to receive exposed film is located in the film carriage. This enables exposed film to be transported to a development processor.

Similarly, unexposed film is loaded in a dark room and transported to the camera in light tight cassettes. These are inserted into the film body without further manipulation of the film.

When the camera is used as a dark room model, the exposed film can be made to issue onto a conveyor which can take it direct to an automatic development processor without the help of human agency.

The lens carriage is advantageously mounted so as to be movable on tracks and incorporates a light sensitive cell, a pair, or more, of lenses and an automatic aperture changing mechanism. The camera is arranged so that the correct lens is automatically selected according to the relative positions of the copy, lens, film and the desired magnification. In addition the correct lens aperture is automatically selected. The setting of the aperture diaphragm on each lens is arranged so that it can be varied automatically according to the conjugate distances and also the preselected ratios. Means are also provided for establishing the intensity of illumination of the copy and this information is also transmitted to the exposure control.

The film carriage of the camera preferably incorporates means whereby the film may be cassette loaded into the camera. This system may incorporate two or more rolls of film of different width so that an appropriate width of film can be selected for a particular job in hand. The particular roll of film to be used is clutched-in by an electro-magnetic clutch and fed through a chute to lie adjacent the back-body to which it is secured by a vacuum plate. The required length of film is cut off by a cutter mechanism provided adjacent the back-body. Also carried on the film-carriage are a series of contact and glass screens of varying rulings which can be brought into the optical path when required.

BRIEF DESCRIPTION OF THE DRAWINGS

The invention is diagrammatically illustrated by way of example in the acompanying drawings in which:

FIG. 2 is a diagrammatic side sectional view of the camera illustrated in FIGS. 1A and 1B.

FIG. 3 illustrates the mounting of the movable carriages on the stationary track.

FIG. 4 illustrates the lens change mechanism.

FIG. 5 is a circuit diagram in respect of the mechanism illustrated in FIG. 4.

FIG. 7 is a plan view of the lens shutter mechanism.

FIG. 8 is a side view of the lens shutter mechanism.

FIG. 9 is a perspective view of a film magazine or cassette.

FIGS. 21–24 are circuit diagrams of the computer components illustrated in FIG. 18–20.

DETAILED DESCRIPTION

Figure 1A:
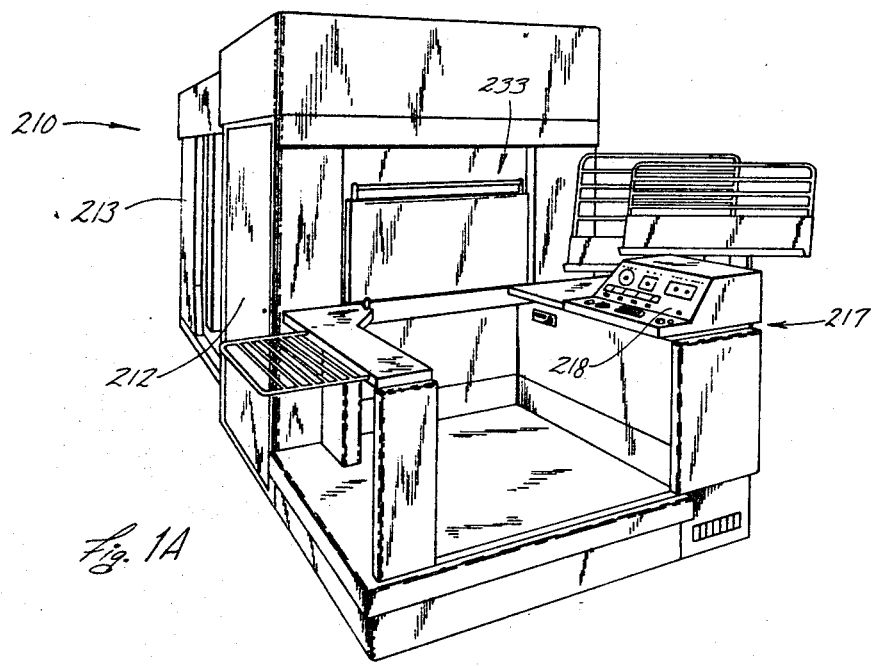
FIG. 1A is a front perspective view of a camera constructed in accordance with the present invention.
Figure 1B:
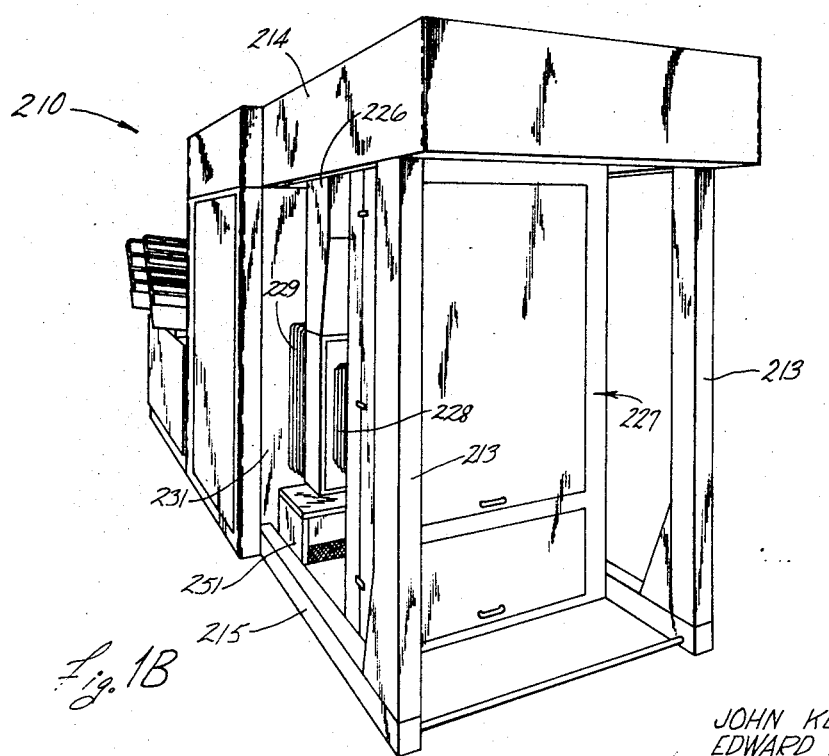
FIG. 1B is a rear perspective view of the camera illustrated in FIG. 1A.

FIGS. 1A, 1B and 2 illustrate the overall camera arrangement 210 wherein there is provided a structure 211 having front and rear supports 212 and 213 interconnected by top and bottom members 214 and 215.

Loacted adjacent to the front support 212 is a control console 217 for permitting operation of the camera. The control console 217 includes a control panel 218 which can be conveniently operated by means of an operator, there being provided an operator's seat 219 for permitting the operator to be conveniently positioned in front of the panel 218. Conventional cables 221 extend from the control panel 218 to the various control devices for permitting adjustment and actuation of the camera.

The structure 211 is provided with an overhead support beam 222 (FIG. 2) which extends between the front and rear supports 212 and 213 and is supported thereon by anti-vibration mountings 223 and 224. The overhead support beam 222 is provided with guide tracks 225 thereon whereby the beam 222 rollingly supports a lens carriage 226, a film carriage 227 and a copy holder means 233. Lens carriage 226 and film carriage 227 are interconnected by a first extendable bellows 228, with a further extendable bellows 229 being connected between the lens carriage 226 and a stationary partition member 231. Suitable lamps 232 are positioned adjacent the partition 231 for illuminating the copy holder means 233, which copy holder means is movably mounted adjacent the front support 212 for easy access by the operator located at the control console 217. A suitable flash screen 253 is provided adjacent the copy holder 233.

The lens carriage 226 has mounted thereon a shutter mechanism 234, a filter mechanism 235 and a lens and lens-aperture mechanism 236. A pair of mirror assemblies 237 and 238 are positioned adjacent the opposite sides of the shutter mechanism, lens and lens-aperture mechanism. An aperture control mechanism 239 is also positioned on the lens carriage 226 and is interconnected to the lens-aperture mechanism 236 in a manner described hereinafter. The aperture control mechanism includes a connecting drive 241 for permitting adjustment of the aperture according to the relative positions of the lens carriage 226 and the film carriage 227.

Considering now the film carriage 227, same includes a lift frame 242 rollably mounted on the carriage for vertical movement, which lift frame has a plurality of unexposed rolls of film 243 mounted thereon, which rolls of film may be mounted in cassettes. A vacuum plate 244 is mounted below the film rolls with a suitable film cutting mechanism 245 being provided directly adjacent the vacuum plate. A screen transport frame 246 is mounted on the carriage 227 for movement toward and away from the vacuum plate 244. A suitable screen store 247 is mounted on the carriage 227 directly beneath the screen transport frame 246.

The camera further includes a sequence control unit 248 mounted on the film carriage 227 and a film drawer 249 mounted at the lower end of the carriage 227. A vacuum pump 251 provides the necessary vacuum for operation of the vacuum plate 244 during operation of the camera. Further, suitable electrical analogue focus units 252 are provided on the lens and film carriages 226 and 227, which analogue units are connected to the control console for permitting the necessary control functions to be performed on the lens and film carriages, as programmed by the settings of the control panel 218.

The overall structure of the camera 210 constructed according to the present invention has been briefly described above. A detailed description of the essential components and systems of the camera will be described hereinafter.

Figure 6:
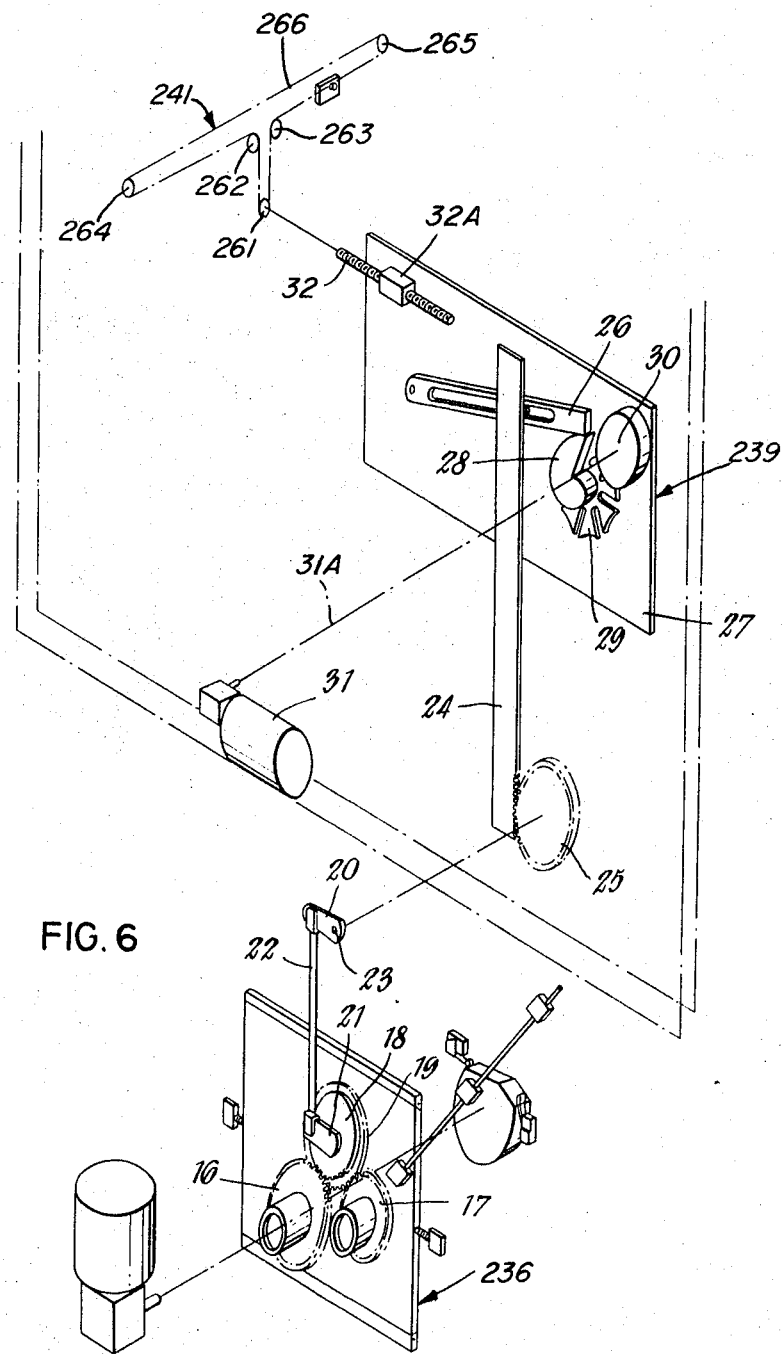
FIG. 6 illustrates the lens changing and aperture setting mechanism.

Considering first the components mounted on the lens carriage 226, FIGS. 4–6 illustrate therein the lens-aperture mechanism 236, which includes a lens changing mechanism for two lenses, in which either one of the two lenses 1 and 2 can be brought into the optical axis of a camera by remote control. Control means as shown in FIG. 5 are provided by which a lens can be selected at a predetermined point in the conjugate focal distance of the camera. The pair of lenses 1 and 2 are located on a carrier plate 3 which is mounted on the lens carriage 226 for movement in a linear direction by two ball guides 4 and 5. The movement is such that at one extreme of the movement, one lens is centered on the optial axis of the camera and at the other extreme the second lens is centered on the optical axis of the camera. The arcuate stop positions are obtained by means of adjusting screws mounted on carrier plate 3 and which act against stops 6 and 7 mounted on lens carriage 226.

The motion of the lens carrier plate 3 is obtained from a motor and gear box 8, which drives a cam 9, the motor and gear box 8 being mounted on carriage 226. Carried on the cam 9 is a pivoting block 10 which is free to slide on a spring steel rod 11. The rod 11 is also located in pivoted blocks 12 and 13. Block 12 is free to pivot on the lens carrier plate 3 and also holds the rod 11 by means of a clamp screw or the like. Block 13 is pivotally mounted on the lens carriage 226. The block 13 is also free to slide on rod 11. Two switches 14 and 15 are carried on the carriage 226 and are connected in such a manner that the circuit of motor 8 is broken when the lens carrier plate 3 is at either of its extreme positions of movement.

The stop position of the cam 9 is so arranged that the spring steel rod 11 is deflected by overrun of the motor 8 after actuation of switch 14 or switch 15 thereby urging the lens carrier plate 3 against its corresponding stop.

The lens carrier plate 3 is automatically moved to select the appropriate lens when a determined magnification is set on the control panel 218 of the camera. This is carried out by the positioning of switch disks 311 and 312 (FIG. 5) which are attached to the hundreds and tens controls, respectively, of the magnification setting switch. Rotation of the tens switch 312 will cause one lens to be in position, for example, between 20 and 50 units and the other lens in position between 50 and 200. It can be seen that any predetermined number can be arranged for the changeover point by altering the position on the switch where the circuits are broken.

In a case where three lenses are required, the spring steel rod 11 is increased in length and the cam 9 operates switches 14 and 15 and an extra switch for the third lens. An electrically positioned stop is used in this case to locate the lens carrier plate 3 in the central position. The stop is positioned by a solenoid.

It has been found that the lens aperture diameter is proportional to the image distance on a camera, divided by a fixed number, and it is desirable to be able to vary the aperture diameter as the image distance is varied and also to vary the fixed divisor.

As shown in FIG. 6, the lens and lens-aperture mechanism 236 includes setting systems comprising gears 16 and 17 located on the aperture control rings of the lenses 1 and 2, respectively, and meshed with gears 18 and 19 located on a common shaft, the ratio between the gears being such that the apertures of the two lenses are in the same ratio as the two image distances for a given magnification.

Rotation of the gears 18 and 19 is obtained from levers 20 and 21 and link 22 which connect the gears to a central pivot 23, which pivot is rotatably supported on the lens carriage 226. This pivot 23 is rotated by the movement of a push rod or rack 24 and a gear 25. If, as shown in FIG. 2, a mirror system is used, then the levers and link are replaced by a universal jointed drive.

Figure 13:
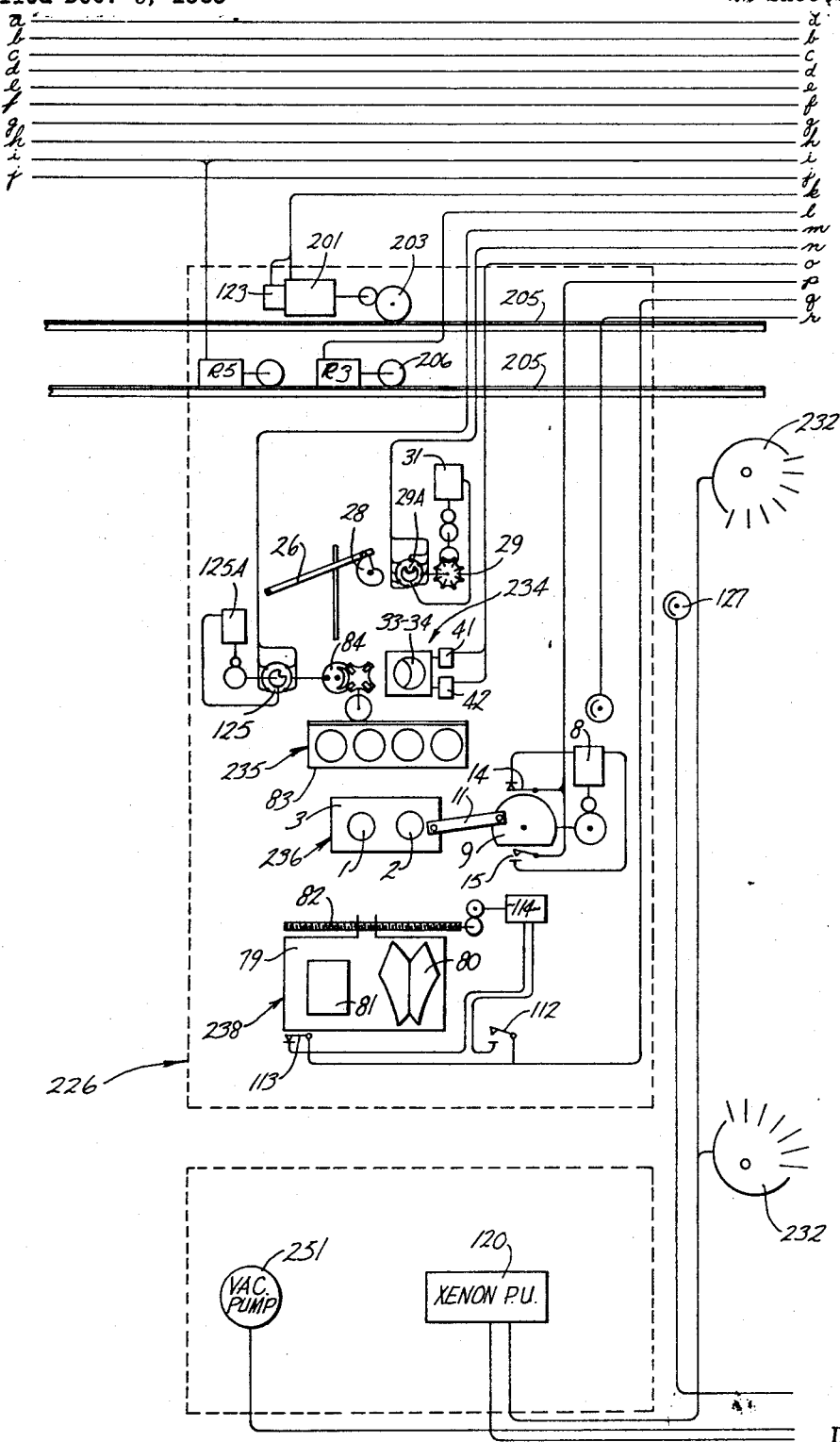

A ratio lever 26 is pivotally carried on a plate 27 and the angle of lever 26 is modified to suit the $V/X$ ratio, where $V$ denotes the image distance and $X$ is the fixed number, by rotation of the cam 28. Cam 28 is driven by a Geneva wheel 29 and crank 30 from a motor and gear box 31 through a drive shaft indicated diagrammatically by 31A. The Geneva wheel 29 also carries a switch disk 29A (FIG. 13). The push rod 24 is spring loaded against the ratio lever 26.

Plate 27 is movably mounted on carriage 226 and is driven horizontally relative thereto by a screw 32 and nut 32A. Screw 32 is nonrotatably interconnected to a sprocket 261, which sprocket is rotatably mounted on the lens carriage 226 and comprises a portion of the connecting drive 241. The connecting drive 241 additionally comprises (FIG. 2) a further pair of sprockets 262 and 263 rotatably supported on the lens carriage 226 and end sprockets 264 and 265 rotatably supported on the beam 222, whereupon a flexible member 266, such as a toothed belt or chain, extends therearound and is fixedly connected to the film carriage 227. In this manner relative movement of the lens carriage 226 and film carriage 227 causes movement of the flexible member 266 and rotation of the sprocket 261 and screw 32 so that the plate 27 is moved in relationship to the image distance $V$ but on a reduced scale.

Movement of the lens carriage 226 causes plate 27 to move so that the push rod 24 rotates gear 25 which, through the pivot 23 and levers 20 and 21 and link 22, rotates the aperture rings of the lenses 1 and 2, thereby adjusting the size of the aperture. Further, adjustment of the lens aperture is controlled by the rotation of cam 28, which alters the angle of lever 26.

Rotation of the Geneva wheel 29 for the various settings of $V/X$ is obtained from the exposure control 115 (FIG. 12) by completing a circuit which causes motor 31 to run until the switch disk 29A breaks the circuit.

The shutter system 234 is shown in FIGS. 7 and 8 and consists of two shaped leaves 33 and 34 which are pivoted and linked in such a manner that when the connecting link 39 is moved, the shutter opens. Reversal of the movement of the link causes the shutter to close. Opening of the shutter is performed by the action of a rotary solenoid and similarly the closing of the shutter is performed by a second rotary solenoid.

Specifically, shutter leaves 33 and 34 are carried between two support plates 35 and 36 in which pivot bearings 37 and 38 are located. The connecting link plate 39 is positioned above the leaves 33 and 34 and is pivotally connected to them at 40 and 40A, respectively, which pivots are located at the same distance from the pivots 37 and 38, respectively. Two rotary solenoids 41 and 42 are carried by the support plate 35, one of them having clockwise rotation and the other anti-clockwise rotation. A pin 43 is carried on the armature of each solenoid and is located at a distance from the center of rotation equal to the distance between pivots 37 and 40, and 38 and 40A.

When an electric current is applied to solenoid 41, its armature rotates causing the link plate 39 to move thereby causing the shutter leaves 33 and 34 to move apart. This motion of the link 39 also causes the armature of solenoid 42 to rotate. When an electric current is applied to solenoid 42, the reverse action takes place and the shutter leaves 33 and 34 come together overlapping at their stopped position. Acceleration and deceleration loads are accommodated by nylon bushes at all pivot positions and friction is reduced by the use of polytetrafluoroethylene bearings.

Various methods of obtaining different densities of negatives by means of subsidiary flash exposure are commonly available. The preferred method uses the reflection ability of a white screen 253 (FIG. 2) which is brought into the optical path by electric motor drive 121 (FIG. 12) and, upon being illuminated, reflects light into the lens. An interlock switch 78 (FIG. 12) is also provided which prevents completion of the exposure cycle if the screen is incorrectly positioned.

Certain aspects of photography call for the image to be reversed in one direction and in the above camera this is performed as follows:

The lens carriage and change mechanism shown in FIG. 4 is positioned so that the optical axis of the lens is in a vertical plane as illustrated in FIG. 2. Located above the lens mechanism 236 is the fixed flat mirror 237 positioned at 45° to the optical path so that rays passing through the lens are deflected into the horizontal plane and are directed onto the vertical image plane as defined by the vacuum plate 244.

Beneath the lens mechanism 236 is a mirror assembly 238 (FIGS. 2 and 13) which may include a carriage 79 which carries a reversing roof mirror assembly 80 and a flat mirror assembly 81. The carriage can be traversed by means of a motor driven lead screw 82 so that either the roof mirror or the flat mirror is located in the optical path beneath the lens. The two mirrors are positioned at an angle of 45° to the optical path and reflect the horizontal rays from the vertical plane of the copy holder 233 through the lens mechanism 236.

Located immediately above the lens mechanism 236 is the filter mechanism 235 (FIG. 13), which may comprise sliding member 83 capable of carrying a number of different filters. This sliding member 83 is traversed by a step mechanism 84 of Geneva type, as driven by a motor 125A through a multiposition switch 125, in such a manner that any selected filter may be located in the optical path.

All motions on the lens and mirror assemblies are controlled remotely from the control console 217 by electrical controls. In the case of the lens mechanism 236, this is as indicated in FIG. 5. In the case of the mirror assembly, this is carried out by button controlled switches situated on the operators control panel 218. In the case of the filter selection, the selection is arranged by switches associated with the screen selection and is activated by circuits completed by the sequence control unit 248.

Figure 10:
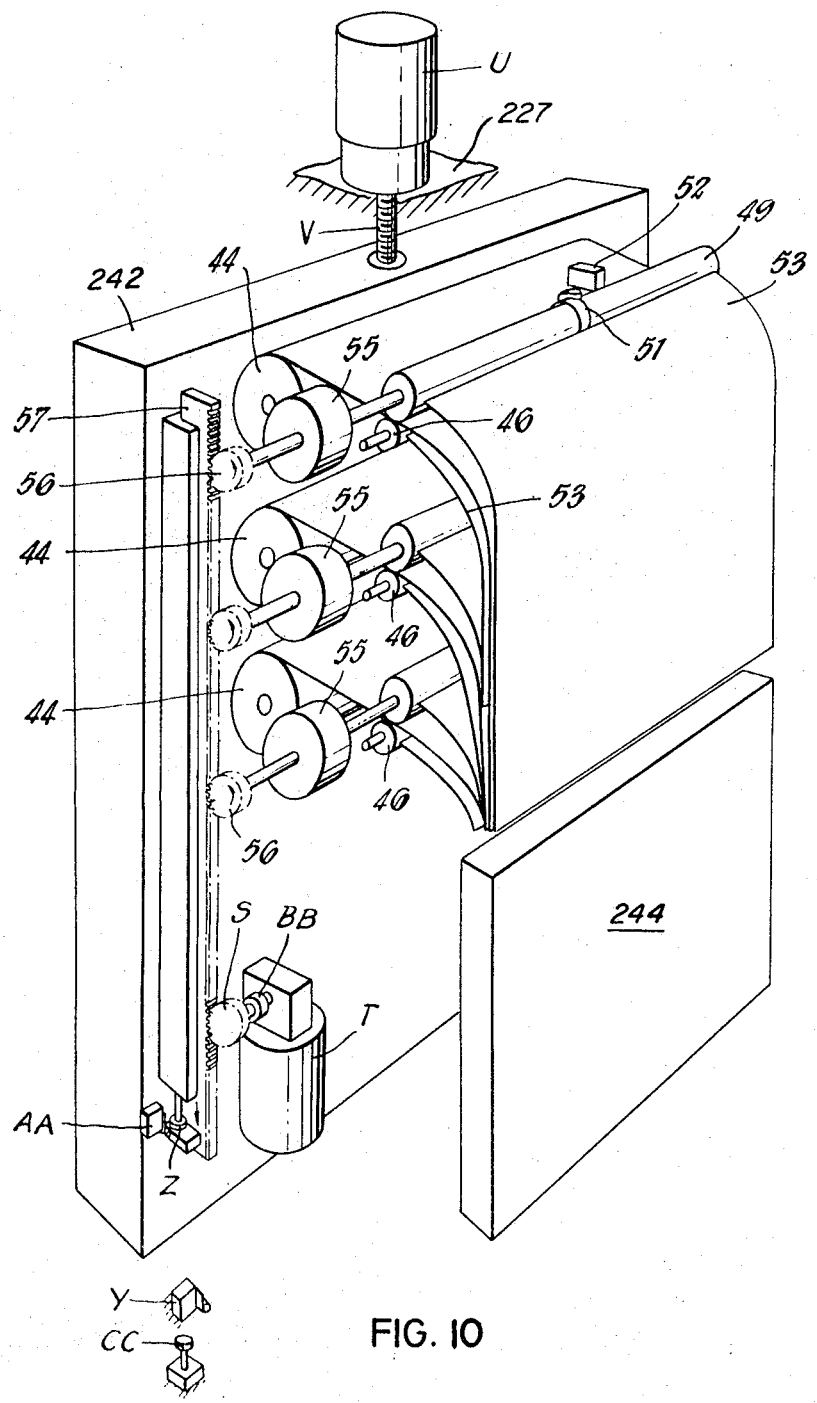
FIG. 10 illustrates a film feed apparatus from a light tight chamber.

Considering now the film carriage 227 and, in particular, the components mounted thereon, FIGS. 9 and 10 illustrate that the unexposed film may be carried in a light tight cassette 43 or in a light tight chamber wherein it is mounted between two spool-ends 44 and carried on a center shaft 45 which can be readily removed and is free to pivot. A spring loaded roller 46 is provided for each film, either on the front of the cassette or in the light tight chamber, over which the film passes.

When cassettes are used they are loaded into a film casing which is capable of taking three cassettes. Each cassette is placed on a rod having a toothed pinion 47 at each end, which pinion run on racks 48 attached to the sides of the film casing. These pinions guide the cassette into position ensuring that the roller is presented parallel to a drive roller 49 (FIG. 10) in the film casing. The cassette is supported on guides at each end and held in position by spring loaded catches 50 located in each handle.

When a roller 46 is in contact with a drive roller 49, gears carried at one end of each roller mesh and ensure no slip between the rollers. Also the roller 46 applies a pressure to the drive roller 49 by virtual of its spring loading. The film is trapped between the rollers.

The action of trapping the film between the rollers causes a ring 51 (FIG. 10) located at the center of the drive rollers 49 to roll around the drive roller. This action depresses a switch 52 and completes a "film present" circuit and an indication signal lamp on the control panel is illuminated.

The film casing has guides 53 through which the film passes and an opening at the bottom through which the film issues in front of the vacuum plate or platen 244, which plate holds the film in position by means of vacuum. The film, when in this position, may be cut to length by the cutting mechanism 245.

The drive rollers 49 are connected by electro-magnetic clutches 55 and pinions 56 to a sliding rack 57 which is driven by a motor T and gear-box through a pinion S, in a direction such that the rotation of drive roller 49 causes the film to be issued. Any one of the films contained at the three positions in the film casing or in three cassettes can be selected by energizing the appropriate magnetic clutch.

The film casing and vacuum plate 244 are mounted on the lift frame 242 which is capable of moving across the optical center line of the camera and, in the case of the present arrangement, is constrained to move in a vertical direction powered by motor and gear box U and screw jack V.

A preferred method of setting the position of the lift frame 242 in relation to the optical axis of the camera is to provide a rotary synchronizing device 92 (FIG. 14) connected to the lift frame 242 and so geared that the full range of movement of the lift frame 242 corresponds to less than one turn of the rotary device 92. A film length setting control 93 is provided on the control panel 218 and actuates a movable member 94 attached to the control spindle 94A adjacent one end and bearing a reed switch 98 thereon. A second rotary synchronizing device 95, electrically connected to the first, and mounted coaxial with the control spindle, drives a second movable member 96 bearing a magnet 97. The lift frame 242 is raised until this second member 96, whose movement relates to that of the lift frame, actuates the reed switch 98 by proximity to the magnet 97. The lift frame drive is then de-energized.

The top edge of the vacuum plate 244 can be positioned at any point relative to the optical center line depending on the general requirements of the operator. For example, if a film length of less than 6" is never to be needed, then the plate can be positioned such that the upper six inches is spaced equally about the optical center line, whereas if a film length of less than 4½" will never be required then the plate may be positioned so that the upper four and a half inches is spaced equally about the optical center line.

A switch Y is located on the carriage 227 and is positioned so that it is just operated by the rack 57 when the lift frame 242 is in a position such that the upper edge of the vacuum plate 244 is a determined distance above the optical center line of the camera, which can be called the zero position.

Stop Z is attached to the movable lift frame 242 and provides a fixed location for the rack 57 when it is in its maximum up or zero position. Switch AA is also attached to the moving lift frame 242 so that it is operated by the rack 57 just before it reaches the stop Z. This switch breaks the reversing circuit of the motor T. A slip clutch BB located between the output shaft of motor-gearbox T and the pinion S so that it is free to slip at a predetermined torque.

To actuate the film issue system, the lift frame 242 is caused to rise by means of the motor and gearbox U and screw threads V until the length of vacuum plate 244 equivalent to the required film length is positioned centrally about the optical center line of the camera. At the same time, the film casing mounted on lift frame 242 will be lifted the same amount moving the rack 57 away from the fixed stop switch Y.

The motor T is now caused to run and drives the rack 57 in a downward direction by means of pinion S until the stop CC is reached and the switch Y is operated causing the motor T to stop. The downward motion of the rack 57 drives the pinions 56 and these in turn rotate the drive roller 49 of the selected film by means of the preselected magnetic clutch 55. The ratio between the rack 57 and pinions 56 is such that the correct amount of film is issued depending on the distance the rack has been moved initially from the switch Y position.

With the film issued it may now be cut along the top edge of the vacuum plate or not as desired.

To return the rack 57 to its original position and prepare for a further issue of film the magnetic clutch 55 is deenergized and the motor and gearbox T is caused to rotate in reverse driving the rack 57 in an upward direction until it reaches the stop Z and the switch AA which disconnects the motor T. Overrun of the motor is absorbed by the slip clutch BB.

The lift frame 242 can be lowered to its zero position if required before or after the film issue drive has been brought to zero. Should a number of negatives of the same size be required, then the lift frame 242 and vacuum plate 244 could be left in its raised position.

Figure 16:
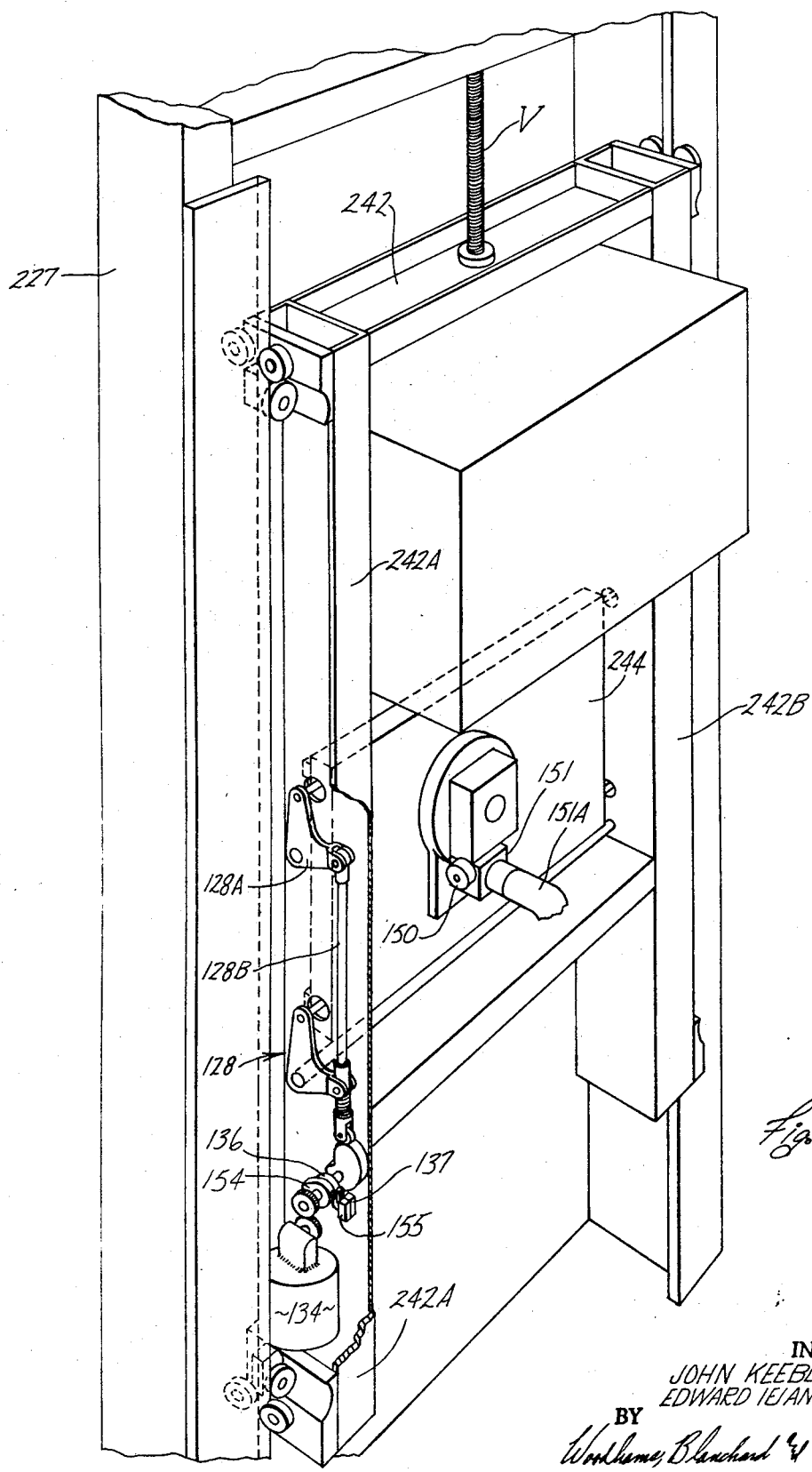
FIG. 16 illustrates the vacuum plate linkage and lift frame supports.

After the film has been issued so as to be positioned in front of the vacuum plate 244, the vacuum plate is then moved forwardly to position same within the focal plane of the camera. FIG. 16 illustrates therein the mounting of the vacuum plate 244 on the lift frame 242 and the manner in which the vacuum plate is moved forwardly to position same in the focal plane.

As illustrated in FIG. 16, the lift frame 242 is mounted for vertical slideable movement on the film carriage 227, being actuated by means of the screw V. The lift frame 244 has opposite hollow side members 242A and 242B between which is positioned the vacuum plate 244. The vacuum plate 244 is supported on the lift frame 242 by means of a linkage 128, which linkage includes pairs of bell-crank levers 128A pivotally mounted on each of the side members 242A and 242B, which bell-crank levers are each pivotally connected to the vacuum plate 244 at one end thereof, the other corresponding ends of the bell-crank levers 128A being pivotally interconnected by means of an intermediate link 128B. The lower end of the link 128B is provided with a cam roller thereon which bears on the cam 135, which cam is in turn rotatably moved by means of a motor 134 which is mounted on the side member 242A. Rotation of motor 134 and corresponding rotation of cam 135 causes the bell-crank levers 128A to pivot, which in turn causes forward or rearward movement of the vacuum plate 244 relative to the lift frame 242.

The vacuum plate 244 also has a valve 151 mounted thereon, the position of which is controlled by means of an electrical solenoid 150. The valve 151 controls the opening and closing of conduit 151A, which conduit is connected to the vacuum pump 251 for controlling the vacuum imposed on the vacuum plate 244.

Figure 15:
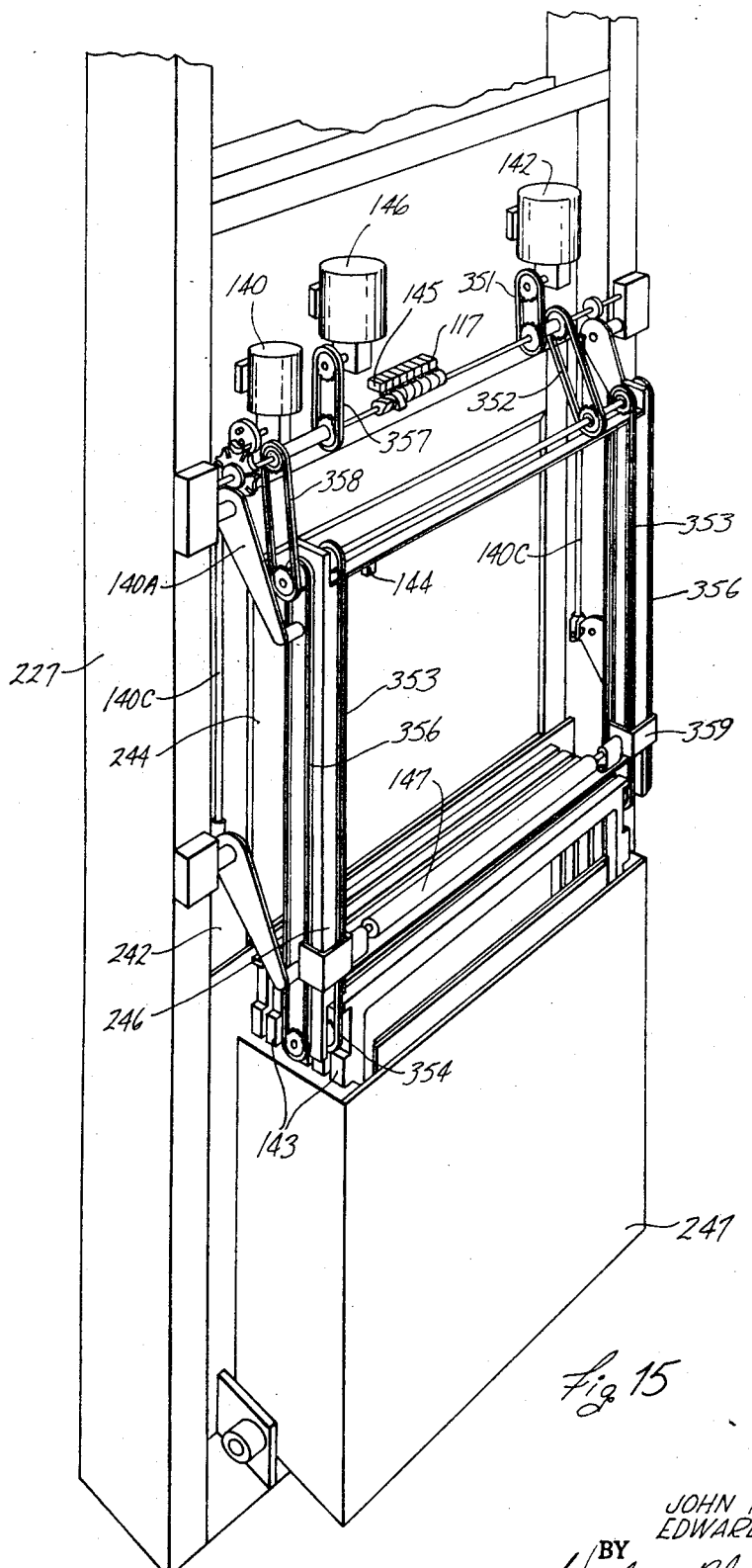
FIG. 15 illustrates the screen storage and selection mechanism.

As illustrated in FIG. 15, the film carriage 227 also has the screen store 227 mounted thereon, in which is positioned a plurality of screens 143. A suitable mechanical system is provided for permitting a selected screen 143 to be removed from the store and lifted into a position adjacent the vacuum plate 244.

The mechanical system for causing movement of a selected screen 143 includes a motor 140 which is mounted on the film carriage 227, which motor controls rotation of the Geneva wheel 140B, which in turn causes oscillation of a pair of parallel levers 140A. Levers 140A are pivotably mounted on the carriage 227 and are interconnected for simultaneous oscillation by means of a link 140 C. The free ends of levers 140 A are pivotally connected to the transport frame 246. The parallel levers 140A permit the transport frame 246 to be moved laterally over the screen store 247.

After the transport frame 246 has been positioned over a selected screen 143, motor 142 is energized causing rotation of intermediate chains 351 and 352, which in turn drives the lift chains 353 which are rotatably mounted on the transport frame 246. The chains 353 have lifting lugs 354 thereon which are adapted to engage projections formed on the upper edge of the screens for permitting a selected screen 143 to be lifted upwardly so as to be positioned in the transport frame 246.

After the screen 143 is lifted upwardly into the transport frame 246, motor 142 is de-energized and motor 140 is again energized to move the transport frame 246 and the selected screen 143 laterally toward the vacuum plate 244.

The transport frame 246 has a further pair of chains 356 rotatably supported thereon, which chains are driven from a further motor 146 by means of intermediate chains 357 and 358. The further chains 356 each have a support member 359 thereon. A roller 147 extends between the supports 359, which roller is adapted to roll the selected screen for removing creases or wrinkles therefrom after the screen has been positioned on the transport frame 246 and in contact with the vacuum plate 244.

The camera is also provided with a copy holder device 233, shown generally in FIG. 2, which is pivoted so that it may be loaded when lying in a horizontal plane and which may then be swung into a vertical plane so that the copy therein may be reproduced. The copy holder comprises a backboard and a transparent, preferably glass, cover or lid which is hinged to the backboard and which overlies the backboard.

The copy holder frame may be swung from a horizontal to a vertical position by hand and a damping action is provided during the last part of the movement to provide a gentle approach to its limiting position. When the stop is reached a force is required to hold the copy holder in that position. A similar procedure takes place when the copy holder is swung from the vertical to the horizontal position.

A catch forms the means by which the glass carrying lid is locked to the copy holder frame and by which the frame is locked in the horizontal position.

It is necessary that the copy holder should be locked in a horizontal position before the lid can be raised and also, when the lid is raised, that the copy holder frame remains locked and cannot readily be released until the lid is closed. It is a further requirement that the lid should not be opened when the copy holder is not in the horizontal position.

In a camera where the control position is remote from the film it is essential that the positioning of the film, the cutting of the film, selection and positioning of screens, exposure, and ejection of the film are carried out to a predetermined sequence which can be varied according to requirements.

To enable this to be accomplished a sequence controller 248 is used which comprises a stepping means with suitable switch circuits and a control means whereby each action is checked for completion before stepping to the next sequence.

Advantageously the stepping means is obtained from dry reed stepping modules but it could equally be performed by solid state switches of the NOR type. The output to the various motors and actuators is taken from relays which are controlled by the stepping modules. The modules are caused to step by electrical pulses which originate from micro or reed switches positioned so that they indicate the required stop position of each particular action. Where the stopping position is a variable, means are provided for the switch or switch actuator to be adjusted.

Figure 11:
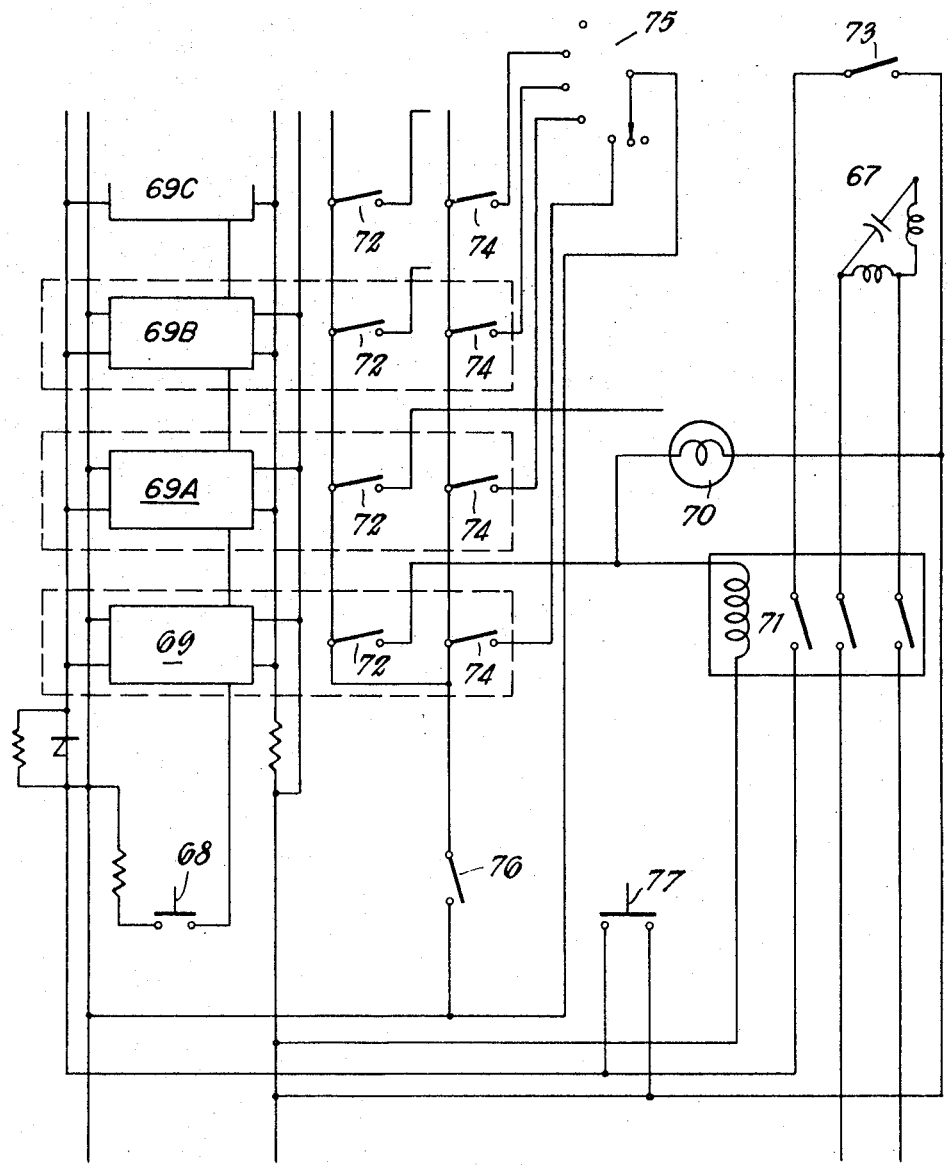
FIG. 11 is a diagram of the sequence control apparatus.

Referring to FIG. 11, the action of the stepping modules is automatic once the initiating pulse circuit is completed. On completion of the manually-actuated start switch 68 the first module 69 is energized and its output contacts are closed. These complete a circuit to a signal lamp 70 and to a relay 71 which operates causing its output contacts to close. This action completes a circuit for a motor 67 or the like and a circuit for the limit switch 73. The motor 67 runs and drives its particular camera function until limit switch 73 is operated. Closure of switch 73 causes a voltage to appear at the stepping module 69 via contacts on relay 71. This causes the module output contacts 72 to open which de-energizes relay 71 and breaks the signal circuit from switch 73 and the signal voltage drops. This action takes the form of a pulse and when the voltage approaches zero the next stepping module 69A is energized. The sequence is then repeated causing another set of events to take place.

This sequence is continued until all the required motions are performed. At the last stage the modules are reset and ready for the next cycle. Various actions can be selected or rejected by switching individual modules in or out of the circuit making the system extremely flexible.

In addition to the normal automatic operation the modules can be operated individually by means of a selector switch circuit. In this case one set of module output contacts 74 are connected to a selector switch 75, and the supply to the output contacts 72 is broken by switch 76 and made available via the selector switch 75 and contacts 74.

When the initiating circuit is completed module 69 is energized and output contacts 72 and 74 are closed. Relay 71 and lamp 70 are not energized until the selector switch 75 is moved to position 1. The circuit is then completed and the operation continues as described above.

When the second module 69A is energized similar circumstances exist and its ouput circuit is not completed until the selector switch 75 is moved to position 2. This system enables each action to be evaluated before proceeding with the next action and is useful for checking and maintenance purposes.

In addition a pulse button switch 77 is included in the circuit in which case any action can be selected on the selector switch 75 and by pulsing the switch 77 the modules are each energized in turn but no output will be obtained until the preselected circuit is reached. This enables any action to be operated without affecting any other action and is used in maintenance and fault finding.

The actions of the camera which may be controlled by the sequence controller 248 are as follows:
(1) Film issue.
(2) Vacuum plate 244 forward to exposure position and vacuum on.
(3) Film cut (if required).
(4) Screen 143 selected.
(5) Screen lifted from store 247.
(6) Screen brought to vacuum plate 244.
(7) Roller moved across screen to remove air.
(8) Exposure 1, signal.
(9) Exposure 2, signal.
(10) Roller retracted and vacuum reduced.
(11) Screen 143 moved back to preselected position.
(12) Screen 143 lowered into store 247 and full vacuum applied.
(13) Exposure 3, signal.
(14) Vacuum reduced and vacuum plate 244 retracted.
(15) Vacuum plate 244 lowered.
(16) Film release-vacuum off-sequence finished.

Some actions may be omitted, for example, 5 to 12, for simple line exposures.

The lens focusing system of the invention, can be applied to any camera having two movable carriages 226 and 227 but the system described is for a camera having a stationary copy holder 233, a movable lens holder 226 and a movable film holder 227. These holders are carriages 226 and 227 are able to move along the fixed beam 222 and are driven by means of motors 201 and 202, which motors are mounted on the respective carriages 226 and 227 and have gears 203 and 204 which engage toothed racks 205 secured to the beam 222.

The requirement for focusing is that the lens should be positioned a distance from the copy holder given by the expression $$\frac{f(1+M)}{m}$$

obtained from the conjugated focus equation, where $f$ is the focal length of the lens and $m$ is the magnification.

Similarly the distance between the film and the copy holder is determined by the expression $$\frac{f(1+m)(1+m)}{m}$$

which is also obtained from the conjugated focus equation.

It has been established that the "Wheatstone Bridge Equation"

$$\frac{R1}{R2}=\frac{R3}{R4}$$

is applicable in respect of the related distances for operation.

Dealing with the lens positioning equation if R1 is made to represent $f$, R4 to represent $(1+m)$ and R2 to represent $m$, then R3 will be equivalent to the distance from copy to lens.

Similarly with the film positioning equation and comparing it with $$R7=\frac{R5R8}{R6}$$

if $$\frac{f(1+m)}{m}$$

represents R5, $(1+m)$ represents R8 and R6 is a constant, then R7 will be equivalent to the distance from copy to film.

A detailed description of the lens positioning system, hereinafter referred to as the first bridge, will now be described.

The resistance equivalent to $m$ in the equation is obtained in the first arm of the first bridge from a decade of switched resistances R1A and R2 (FIG. 12) whose values are arranged to give hundreds, tens, units and tenths and are switched in such a manner as to give variation of resistance equivalent to 0.1% of the magnification.

The value $(1+m)$ is obtained by placing a fixed resistor R1B in series with resistor R1A and these together form one arm of a bridge circuit.

The second arm of the first bridge circuit is formed by a decade of switched resistances R2 and is equivalent to $m$.

The third arm of the first bridge which is equivalent to the distance from copy to lens is obtained from a precision potentiometer R3 (FIG. 13) carried by the lens carriage 226 and driven from rack 205 fixed to the support beam 222 of the camera by intermediate gear 206. Motion of the lens body along the support beam causes the wiper to move over the potentiometer varying the resistance.

The fourth arm of the first bridge comprises either fixed resistance R4A or R4B (FIG. 12) each providing a resistance equivalent to $f$, the focal distance of the lens in use. By means of switch S1 either resistance can be brought into circuit depending on the lens in use. Switch S1 can be incorporated on the shaft controlling the decade resistors and can be arranged to switch at a predetermined magnification setting.

The output of the first bridge described above is taken to an amplifier 91 where any error voltage is used to drive the positioning motor 201. The motor 201 causes the lens carriage 226 to move along its guideways and drive the potentiometer R3 until the error voltage is reduced to zero. This point represents the true setting position of the lens relative to the copy according to the input setting of magnification $m$ and focal length $f$.

The film positioning system, hereinafter referred to as the second bridge, includes a first arm formed by the potentiometer R5 which is driven by the motion of the lens carriage 226 by means of rack 205 attached to the guideways. The resistance of this potentiometer R5 will therefore be equivalent to the distance of the lens from the copy which is $$\frac{f(1+m)}{m}$$

The second arm of the second bridge is formed by resistors R8A and R8B. R8A is a decade of switched resistors arranged to be equivalent to $m$ and to be adjustable in steps of tenths, units, tens and hundreds, similar to decades R1A and R2. The resistors of R8A are also coupled to the same setting shafts and, therefore, all decades are set at one operation. Resistance R8B is a fixed resistance which together with R8A forms the equivalent of the equation $(1+m)$ which is R8.

The third arm of the second bridge comprises the potentiometer R7 (FIG. 14) which is carried by the film carriage 227 and has a wiper geared (by gear 207) to rack 205 attached to the beam 222 so that motion of the film carriage 227 will cause the wiper to move over the potentiometer windings.

The fourth arm of the second bridge comprises a fixed resistor R6 which acts as a constant divisor for the equation.

The second bridge now provides the equation $$R7 = \frac{R5 R8}{R6}$$

which is equivalent to $$\frac{f(1+m)}{m} \frac{(1+m)}{k}$$

The output of the second bridge described above is taken to an amplifier 99 where any error voltage is used to drive the positioning motor 202, which causes rotation of gear 204 in meshing engagement with rack 205. This motor 202 causes the film carriage 227 to move along its guide beam 222 and drive potentiometer R7 until the error voltage is reduced to zero. This point represents the true setting position of the film relative to the copy according to the input setting of magnification $m$ and focal length $f$.

ELECTRICAL CIRCUIT DETAILS

Figure 12:
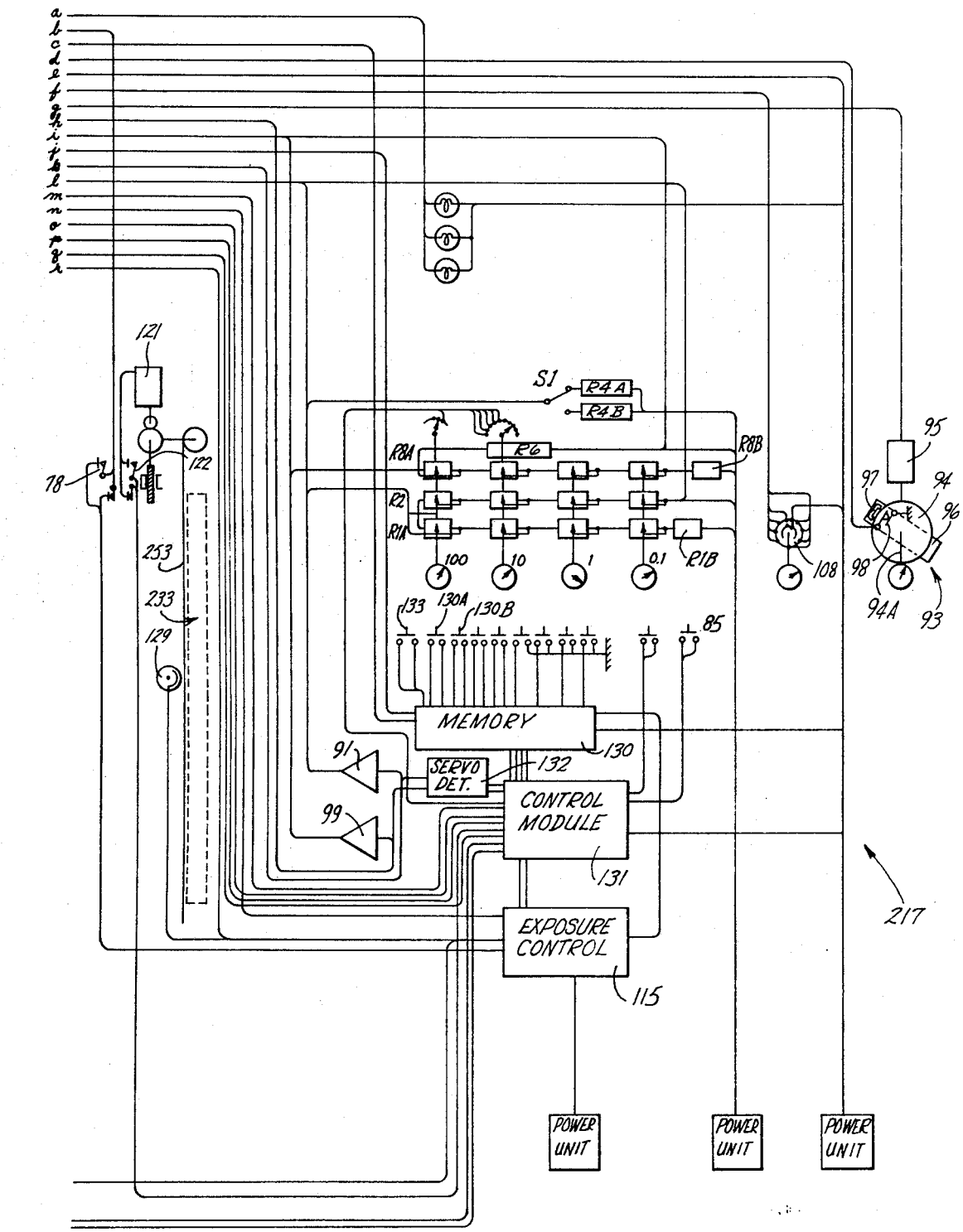
FIGS. 12–14 represent a combined structural and electrical diagram for the overall camera structure.
Figure 14:
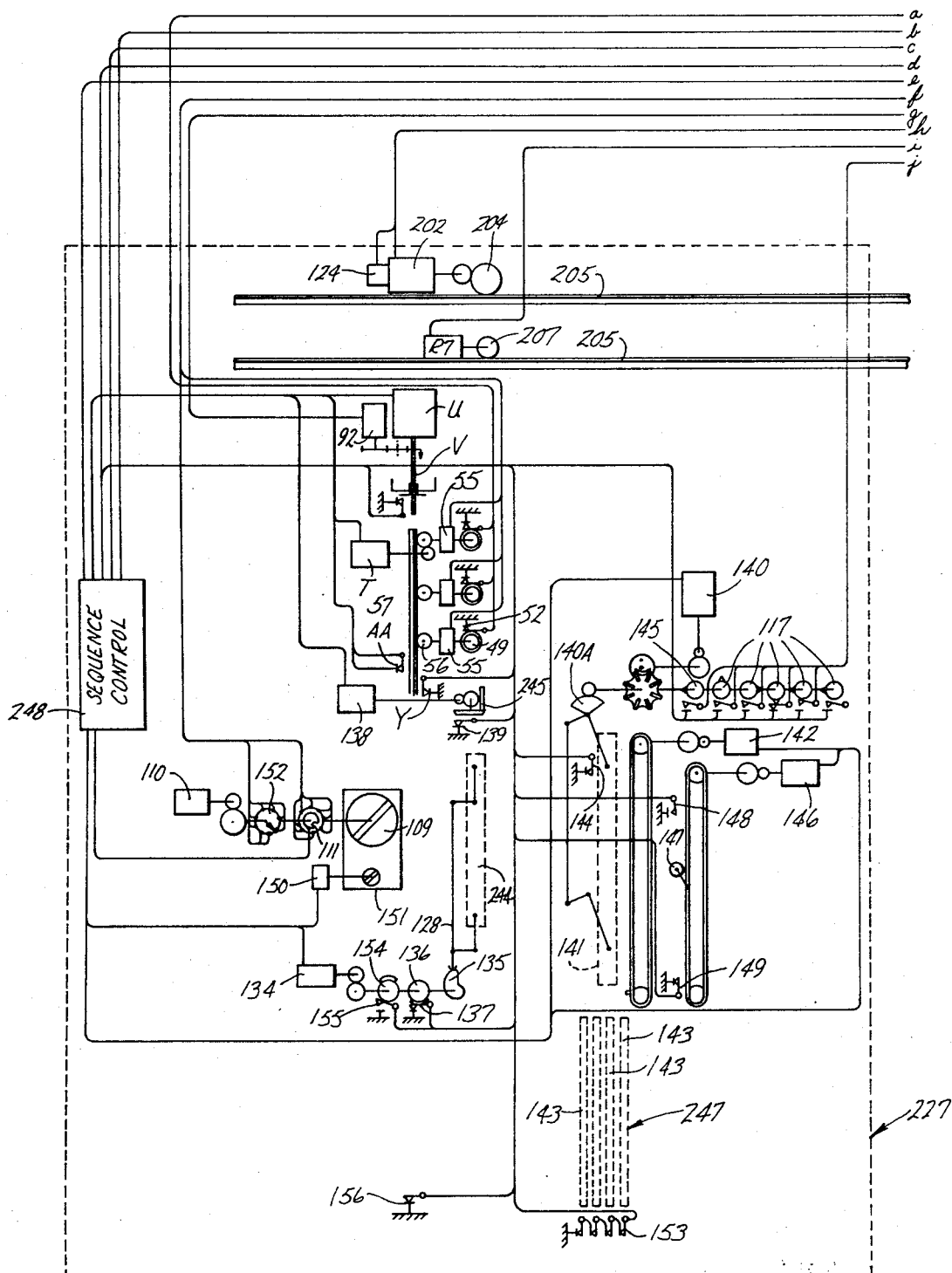

FIGS. 12-14 show the electrical circuit used to provide power and control for the photographic functions of the camera, the circuit being broken in three parts to facilitate illustration thereof. FIG. 12 illustrates those portions of the control system located within the control console 217, whereas FIGS. 13 and 14 illusrate those positions of the control circuit which are directly related to the functions performed on or by the lens and film carriages 226 and 227, respectively. The broken control lines have been designated as "$a, b, c \ldots h, i$ and $j$" to permit FIGS. 12-14 to be related.

The control console 217 contains therein not only the control panel 218 but also a memory unit 130, a control module 131, an exposure control unit 115, servo units and power units. These, in conjunction with the sequence control unit 248 situated on the film carriage, control electrically all of the camera functions.

The control panel 218 carries the magnification setting switches R1A, R2 and R8A which set up the servo bridge values as previously described. The outputs of the two bridges are led to the two amplifiers 91 and 99 and thence to the field coils of the carriage positioning motors 201 and 202. This causes the motors to drive, through gears 203 and 204 in engagement with racks 205, the carriages 226 and 227 and reset the potentiometers R3, R5 and R7 until the bridges become balanced and no output is available at the amplifiers.

Film width is selected by switch 108 which energizes the circuit to one of the film drive clutches 55 and also to the vacuum selection valve 109 carried by the vacuum plate 244. This valve is driven by the motor and gearbox 110 until the dead zone in the rotor of the switch disc 111 reaches the selected circuit contact, whereupon the circuit will be broken and the motor 110 will stop. The area of vacuum over plate 244 will then be equivalent to the film width selected. The film width is programmed by rotating the control 93 as previously described.

Image reversal or lens only exposures may be selected by operating switch 85. This completes a circuit via one of the limit switches 112 and 113 causing the motor 114 to rotate and move the mirror sliding carriage 79 until the selected limit switch is reached. The motor circuit is then broken and the mirror carriage 79 is held against its fixed stop position with the selected mirrors 80 and 81 correctly positioned in the optical path. In addition a circuit is completed to the exposure control 115 so that a trim allowance can be made in the exposure time circuit to compensate for variation of light transmission characteristics between the mirrors.

Push buttons are provided for the selection of negative type and screen ruling size and completes circuits to relays situated in the memory unit 130.

The start button 68 completes the sequence start circuit and energizes the memory unit 130.

Cutting of the film proior to exposure can be programmed by pressing switch 133.

The memory unit 130 contains a series of relays, one for each negative type and screen, as stated by the push buttons, such as buttons 130A, 130B, etc. These are energized by the closing of the start switch 68 and are held in the energized state by contacts on each relay thereby forming a memory. The relays also complete circuits to the exposure control unit 115 so that trim potentiometers, adjusted to the negative type and screen type settings, may be brought into circuit.

In addition the sequence control unit 248 is programmed by the switching out of circuits to modules depending on the negative type selected. Also, the screen circuit is programmed via the switches 117, so that the selected screen 143 can be lifted from the store 247 at the correct instant in the photographic sequence.

On the memory unit 130 are manual setting switches and trim potentiometers. The switches are used to ensure that the program to the sequence control 248 is correct for the type of screen used and also that correction is applied to the focus servo bridge by increasing the resistance value of the film body potentiometer R7 to compensate for the insertion of a glass screen 143 in the optical path. These switches also program the operation of the filter carrier 83 via relays and switch 125.

The control module 131 contains a series of power relays which control the power functions of the lens carriage and copy board illumination. Signals are received from the sequence controller 248 at various stages during a program which operate relays providing power to the servo balance detector 132, the copy lighting generator or power supply 120, the flash screen drive motor 121 via switches 122, and the vacuum pump motor 251. In addition signals are received from the exposure control 115 to operate a relay controlling, in turn, the operation of the shutter solenoids 41 and 42. Likewise signals are received from the servo balance detector 132 which cuts the power to the carriage drive motors 201 and 202 when the correct positions have been reached.

The servo balance detector 132 is a transistorized switching device which causes switched outputs to be obtained when the voltage obtained from the generators 123 and 124, on the carriage positioning drives, reduces to zero. These outputs are utilized to cut the power to the carriage drive motors 201 and 202 and to provide an interlock preventing an exposure taking place until the correct conjugate focus is obtained.

The exposure control unit 115, which is the subject of British patent application No. 17,101/66, measures the flare at the lens by means of the transducer 127 and the light intensity output from the copy lamps 232 by means of the transducer 129. It is also programmed to select the appropriate aperture ratio for each part of the exposure and is trimmed to compensate for variations in film emulsions, copy density and copy contrast. On the completion of the evaluation of these variables and the closing of all interlocks an expose signal is sent to the control module to operate the shutter control relay and a timing circuit commences exposure time. At the completion of the exposure time the expose signal is discontinued and the shutter is closed.

While the operation of the sequence control 248 has been briefly described above, the sequence of events as performed by this unit will now be described in greater detail as follows:

(1) Film issue: On receipt of the start signal the first step or module is energized and motor and gearbox U is caused to run raising the framework 242. This motion causes the resolver 92 to rotate and this is followed by the slave resolver 95. The rotation of slave resolver 95 brings magnet 97 in close proximity to the reed switch 98 causing it to close. This completes the circuit to the sequence control 248 causing it to energize the next module. Motor T is now cause to rotate driving the rack 57 down, rotating the film drive roller 49 and issuing the film in front of the vacuum plate 244. When the rack reaches switch Y the circuit to the sequence control 248 is completed and it steps to the next module.

(2) Vacuum plate forwar dto expose position: The energizing of this module causes motor 134 to run driving the cam 135 which in turn causes the linkage 128 to move, bringing the vacuum platen 244 forward into the focal plane. Motor 134 continues to run until cam 136 operates switch 137. This switch completes the circuit to the sequence control 248 causing it to step to the next module. At the same time a signal is sent to a contactor in the control module 131 to start the vacuum pump 251.

(3) Film cut: If film cut has been programmed, then the circuit to this module is then completed. Should film cut not be required then the module is by-passed. Assuming that the module has been energized, a circuit is completed to the cutter motor 138 which drives the cutter across the film until switch 139 is operated completing the step circuit of the sequence control.

(4) Screen select: The next module energized causes the motor 140 to drive the screen transport frame 246, through intermediate levers 140A, toward the vacuum platen 244 until the switch 117 on the selected circuit is operated causing the step circuit to be completed and stopping the motor 140.

(5) Screen lifted from store: Motor 142 is now energized and the selected screen 143 is lifted from the store 247 into the transport frame 246 until switch 144 is operated. This is positioned such that the screen is stopped central with the optical axis and causes the step circuit to be completed.

(6) Screen brought to vacuum plate: Motor 140 is again energized and drives the screen transport frame 246 toward the vacuum platen 244 until switch 145 is operated causing the step circuit to be completed and stopping the motor 140. At the same time the motor 110 is energized through switch 152 causing it to increase the area of vacuum. As soon as switch 152 has rotated one step the circuit is broken.

(7) Roller moved across screen to remove air: Having stepped to the next module, motor 146 is energized and drives the screen roller 147 in the vertical direction until the dry reed proximity switch 148 is operated. This causes the step circuit to be completed and stops the motor 146.

(8) Exposure 1 signal: When this module is energized a signal is passed via the flash screen interlock switch 78 to the exposure control 115 where it is used to activate exposure timing circuits. At the completion of the exposure time the shutter relay in the control module 131 is released causing the shutter to close and completing the step circuit to the sequence control 248.

(9) Exposure 2 signal: This module passes a signal via the screen interlock switch 78 to the exposure control 115 where it is used to activate exposure timing circuits. Also, it energizes a relay causing the flash screen motor 121 to drive the flash screen 253 into the optical path until the limit switch 122 breaks the circuit. At the completion of the exposure time the shutter relay in the control module 131 is released causing the shutter to close and completing the step circuit to the sequence control. The flash screen motor relay is released and the flash screen motor 121 runs in reverse, rolling the flash screen 253 up and out of the optical path.

(10) Roller retract and vacuum reduced: This module completes the circuit to the motor 146 causing it to drive in reverse thereby lowering the screen roller 147 to its rest position where it operates the switch 149. This completes the step circuit and stops the motor 146. The energizing of this module also causes the solenoid 150 to operate rotating the valve 151 and reducing the area of vacuum on the vacuum platen 244 to a predetermined small area allowing the contact screen 143 to be removed.

(11) Screen back to preselected position: The motor 140 is energized at this state to run in the reverse direction, causing the screen transport frame 246 to be moved back until the switch 117 on the selected circuit is operated. This causes the step circuit to be completed and stops the motor 140.

(12) Screen lowered into store and full vacuum: This module energizes motor 142 so that it will run in the reverse direction lowering the glass screen 143 from the screen transport frame 246 into the screen store 247. When the screen is fully in the store, switch 153 is made completing the step circuit. At the same time circuit to the solenoid 150 is broken, the valve 151 returns under spring action to its rest position and the vacuum area is increased to that initially programmed.

(13) Exposure 3 signal: When this module is energized a signal is passed via the flash screen interlock switch 78 to the exposure control 115 where it is used to activate exposure timing circuits. At the completion of exposure time the shutter relay in the control module is released causing the shutter to close and completing the step circuit to the sequence control.

(14) Vacuum reduced and vacuum plate retract: This module energizes motor 134 so that it rotates in a reverse direction driving cam 135 which in turn allows the vacuum platen linkage 128 to move bringing the platen 244 away from the focal plane. Motor 134 continues to run until cam 154 operates switch 155 completing the step circuit to the sequence control 248 and breaking the motor circuit. At the same time the circuit to solenoid 150 is completed causing operation of valve 151, thereby reducing the area of platen 244 under vacuum.

(15) Vacuum plate lower and film reset: This module completes the reversing circuit to motor U causing it to rotate thereby lowering framework 242. This action causes the resolver 92 to rotate in the reverse direction which is followed by the slave resolver 95. This resets the film length setting control 93 to its zero position. When framework 242 reaches its next position switch 156 is operated completing the step circuit to the sequence control 248 and breaking the motor U circuit. At the same time motor T is caused to rotate in the reverse direction driving rack 57 in an upward direction until switch AA is made which breaks the motor T circuit. During this motion the circuit to the film drive clutches 55 is broken.

(16) Film release-vacuum off: This module energizes a relay which breaks the hold circuit for the vacuum pump causing that to stop. When the vacuum disappears the film is no longer held and drops into the container 249. Also, when the pump motor 251 stops, a vacuum switch 157 is closed completing the step circuit which causes the module to switch off. As this is the last module the sequence is completed and can only be restarted by pressing the start button 68. While this module is energized the circuit to the solenoid 150 is broken, the valve 151 returns under spring action to its next position ready for vacuum to be available over the full programmed area on the next exposure sequence.

An interlock circuit is provided between the switch 156 and the control panel such that the moment the switch is open no power is available to the setting controls, thus preventing damage due to inadvertent operation of controls as well as permitting the pre-programming of the next exposure data.

The photographic system, which includes the mechanical motions and sequence controls described above, is intended to take into consideration all of the variables in the photographic operation, either by preprogramming or by automatic evaluation during the exposure so that a consistent end product or result may be obtained without the aid of the camera operator.

The above desired consistent result is achieved by means of the exposure control or computer 115 which is programmed with a mathematical formula which takes into account various correction factors, particularly correction factors for the camera, for the film and for the copy.

As is well known, each camera contains basic internal structure which effects the consistency and has a factor on the quality of the copy produced. Cameras have internal reflective surfaces which cause flare or lack of light transmission. However, these factors are substantially constant for each camera and are changed only when the mechanical sequence or structure of the camera is changed. Thus, these factors can be corrected or compensated for by applying appropriate mathematically derived factors or signals to the program contained within the exposure computer.

Some of the camera factors which effect light transmission are screen density, aperture ratio, filter factor, variations between the multiple lens, variations in mirror reflectivity, and mean light level inside the lamp housing. Similarly, some of the factors effecting flare are the basic camera construction and the light scatter due to multiple mirror and lens assemblies. Accordingly, these factors are preprogrammed into the camera upon initial installation and the mathematically derived corrections therefor are included within the formula as programmed within the exposed computer.

For consistent photographic results, there must also be taken into account the differences between different batches of film which are to be set into the camera. These differences, as determined by the operator, represent film corrections which must be set into the camera by the operator in the form of a correction for film speed and film contrast, which corrections remain substantially constant for the duration of a selected batch of film. These corrections can be readily varied by the operator in accordance with the batch of film being utilized since the corrections are included within the mathematical formula contained within the computer. The film speed correction factor causes adjustment in the main and highlight or bump exposure, whereas the film correction factor adjusts the flash exposure zero level.

Further, when the film contains a plurality of cassettes containing film therein, then a separate set of controls is provided for each cassette in order to take into account the various film factors as they pertain to each individual film.

Before the operator can photograph any original, he must also take into account variations in the copy, which variations are also compensated for by means of copy correction factors which are fed into the mathematical formula of the exposure computer. The operator must first measure on a reflection densitometer the copy density range and then feed into the camera factors which take into account the highlight and shadow density values. These correction factors as fed into the computer thus correct the basic formula so as to fall within the range of the original. The highlight density factor modifies the main and bump or highlight exposure, while the shadow density factor modifies the flash control.

A photo-transducers at the lens assesses the amount of reflected unfocused light emitted from the copy. This reflected light level is transferred to a mathematically derived correction for copy flare analysis and it is assessed prior to the exposure commencing, the correction being fed to the flash exposure formula which is then altered accordingly.

Once the exposures have commenced, separate phototransducers monitor the light output and correct the exposure levels for any change in light intensity by measuring the reflected light from the flash blind for the flash exposure and the basic level of illumination inside the lamp housing for the main and highlight bump exposures.

Considering now the mathematical formula utilized to program the computer, this formula is used to regulate both the main exposure and the supplementary flash exposure taking into consideration the following factors:

$\check{D}$ Highlight density
$\hat{D}$ shadow density
$k_E$ Film speed
$k_S$ Screen transmission
$I_F$ Flare
N $N_0$ screen exposure
$k_V$ Aperture ratio
$k_F$ Filter
I Main light source
$t$ Exposure duration
$E_H$ Required exposure
K Constant The single main exposure used to determine the highlight density recorded on the negative being exposed can be calculated by means of the following formula:

$$E_H = KIt10^{-\check{D}} k_E k_S k_V k_F$$

The above required exposure $E_H$ thus permits calculation of the exposure time by means of the following formula:

$$t = \frac{E_H}{kI10^{-\check{D}} k_E k_S k_V k_F} \text{ seconds}$$

When a "no screen exposure" is used, the required exposure $E_H$ is split into two parts and two fractions result, the denominator of one containing the screen transmission. Letting N represent the partial "no screen exposure" with N having a value between 0 and 1, then the exposure time can be computed as follows:

$$t = \frac{E_H(1-N)}{KI10^{-\check{D}} k_E k_S k_V k_F} + \frac{E_H N}{KI10^{-\check{D}} k_E k_V k_F}$$

(Main Exposure)   (No Screen Exposure)

Figure 17:
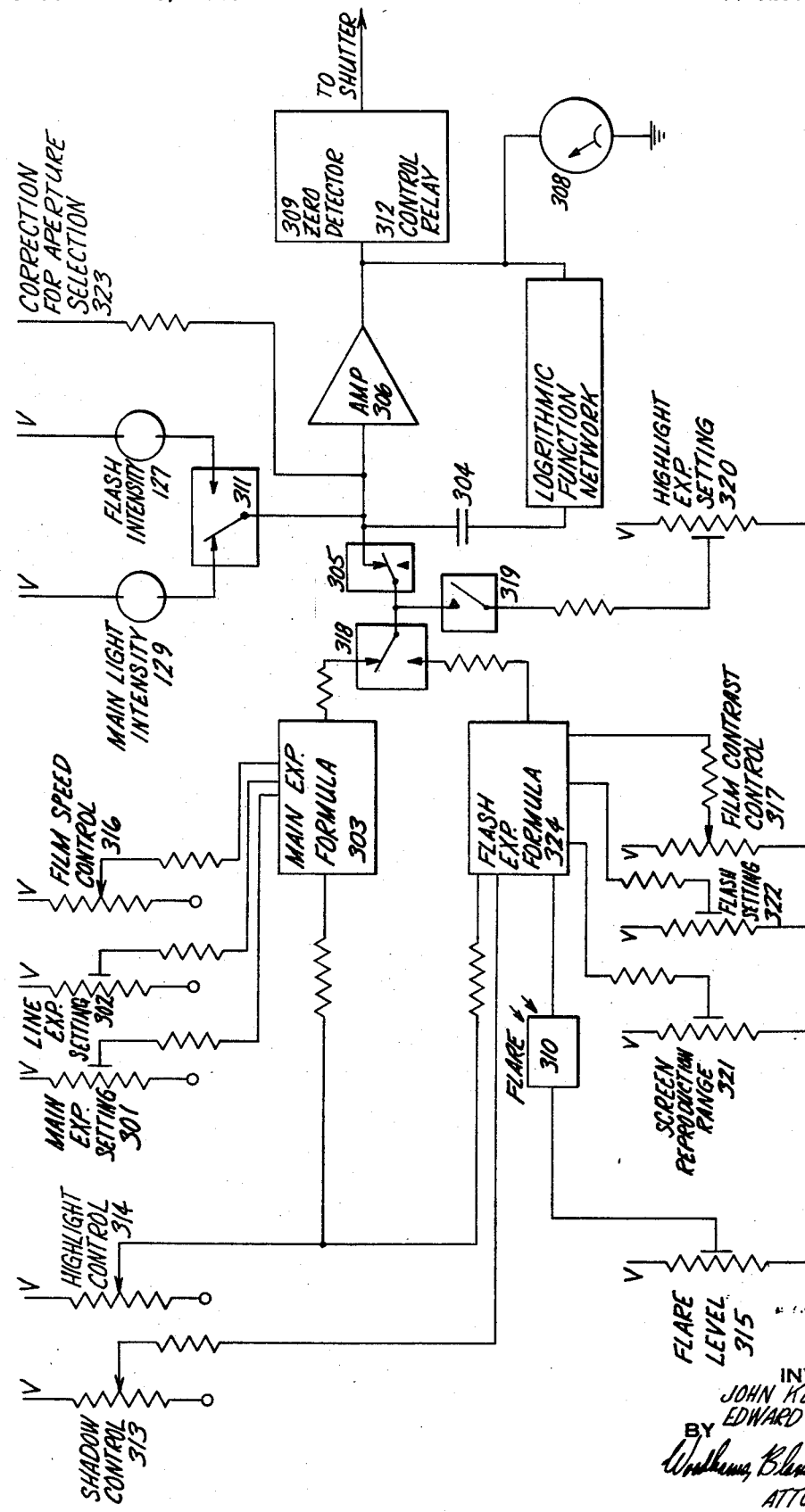
FIG. 17 is a schematic diagram of the exposure computer.

FIG. 17 schematically illustrates the exposure computer, which includes potentiometers 313 and 314 which are the shadow and highlight controls. Elements 301, 302, 320, 321 and 322 are preprogrammed controls to set the basic computer formula limits. These limit controls can be duplicated as many times as necessary by switching circuits, the number of duplications depending upon the number of screens and the number of exposure program channels per screen that are required. Potentiometer 302, which is the line exposure limit, can also be duplicated depending upon the number of line exposure channels required.

Potentiometer 315 limits flare and sets the constant flare characteristics for any factor causing flare and can be duplicated as many times as required. Photo-transducer 310 assesses copy flare and modifies the existing level accordingly.

Potentiometers 316 and 317 are film speed and contrast controls, these controls are duplicated as many times as film cassettes are fitted. Relays 318 and 319 set the exposure levels into the integration circuit by selecting the correct part of the formula required. These relays are energized by the sequence control when the correct camera sequence is reached. Relay 305 is energized to initiate the exposure cycle which causes the shutter to be opened.

Photo-transducers 127 and 129 control the duration that the shutter is opend by regulating the change in voltage level of the integrating amplifier 306, 304. When the voltage reaches a predetermined level, the zero detector 309 de-energizes the shutter control relay 312 and finishes the exposure cycle. Relay 305 is then de-energized causing the integration circuit to charge to the level of the next exposure.

The exposure consists of three parts, flash, main and highlight or bump exposures. For each exposure a different V ratio is selected. The V ratios are selected by logic switching by controlling a series of transistor logic circuits with the appropriate signals depending upon exposure sequence, channel selected, screen and V ratio selected. For each V ratio an exposure compensation factor is fed to the computer, this modifies the exposure level computed to allow for the different levels of light due to changes in lens aperture.

At the end of each exposure a pulse is sent to the sequence control to step it to the next sequence. After all exposures have been completed the final pulse steps the exposure control to the standby condition ready for the next exposure cycle.

During the exposure cycle information required for the next original can be programmed into the computer without affecting any information being used for the exposure sequence in progress.

Figure 18:
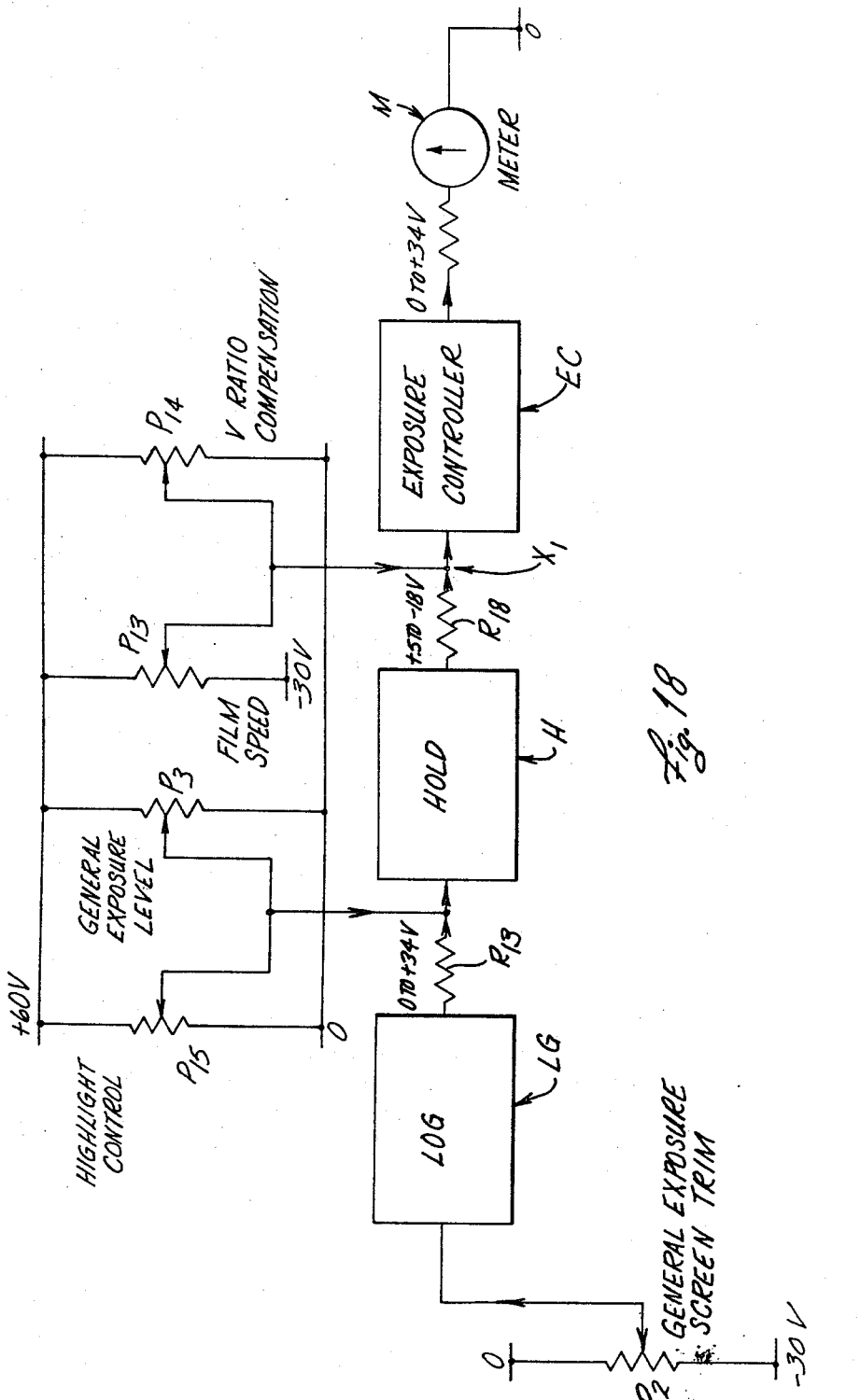
FIGS. 18–20 are schematic block diagrams illustrating the computer operation for general highlight and flash exposure, respectively.

FIG. 18 diagrammatically illustrates the computer operation for a general exposure. The various factors for which adjustments are made by means of adjustable potentiometers are the highlight control $P_{15}$, the general exposure level $P_3$, the V ratio compensation $P_{14}$ and the general exposure screen trim $P_2$. Only the highlight control $P_{15}$ is altered for the particular film being used, the other control factors being predetermined. An input signal as supplied from the general exposure screen trim potentiometer $P_2$ is supplied to the input of the log function generator LG, which generator produces an output voltage of between zero and 34 volts. This output of the log generator LG, which is a logarithmic function of the input, is then supplied to the resistor $R_{13}$ which allows a current output, which in turn is supplied to the hold circuit H.

At the input of the hold circuit a summation of the input currents from the highlight control $P_{15}$, the general exposure level $P_{13}$ and the log function generator LG takes place. The total current is then applied as an input to the integrating hold amplifier $A_2$ (FIG. 21), which amplifier produces an output voltage which is supplied to a resistor $R_{18}$ so as to cause an output current to be supplied from the hold circuit H to the input of the exposure controller EC. The output current from the hold circuit is added to currents from the film speed $P_{13}$ and the V ratio compensation $P_{14}$ with the current summation being supplied as an input to the exposure controller EC. The exposure controller then operates to produce an output current which is supplied to the meter M, the current to the meter being directly proportional to a scale reading of time.

To commerce the exposure, the input to the exposure controller EC is removed and the controller, being an integrating amplifier with a controlled decay time, starts to reduce the output voltage, thereby reducing the time reading on the meter M. At zero time, the exposure of the film is stopped.

Figure 19:
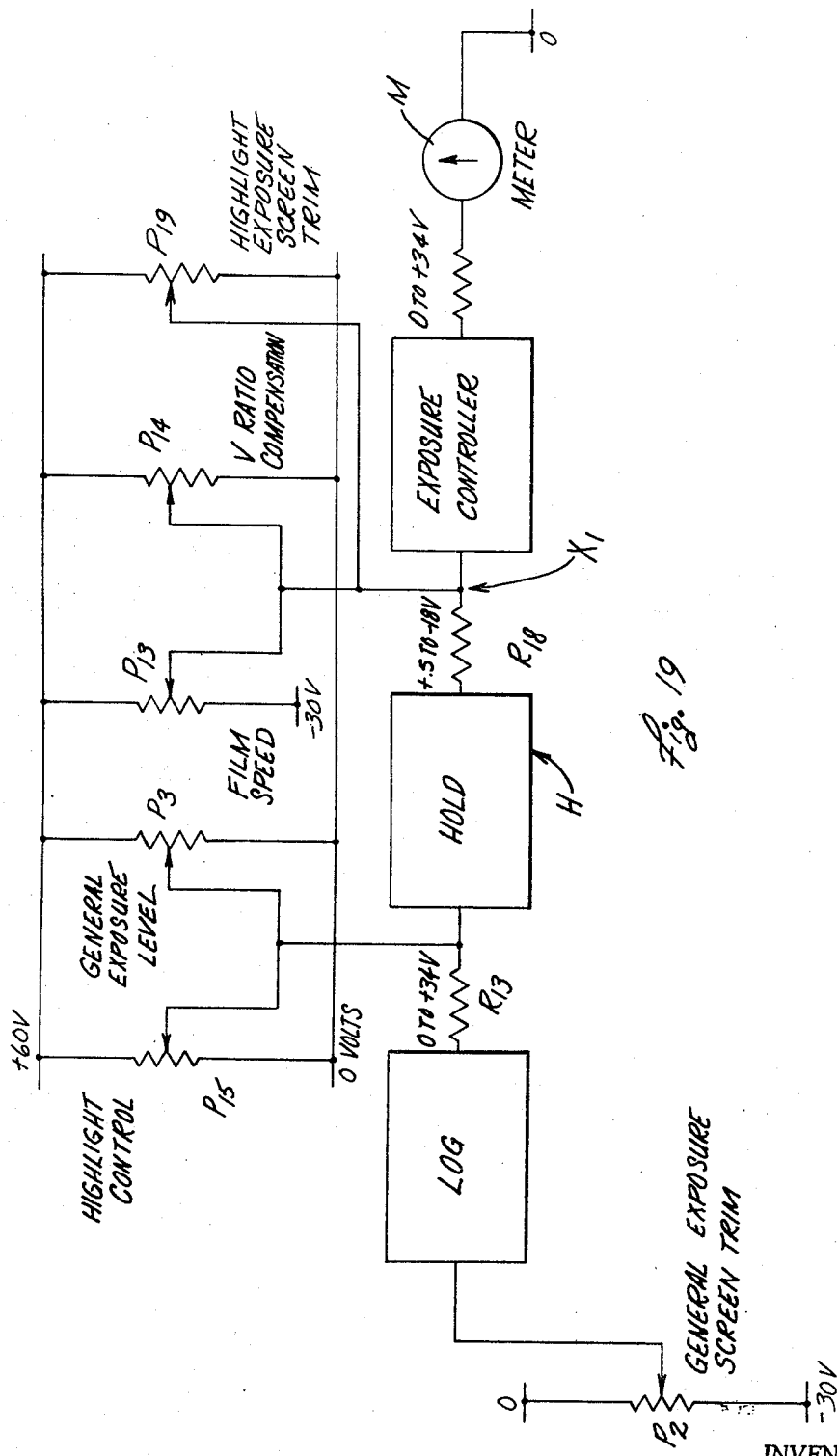

FIG. 19 is similar to FIG. 18 but illustrates the computer operation for highlight exposure. The computer operation is controlled by the same controls as described above relative to FIG. 18, but utilizes an additional potentiometer $P_{19}$ which provides a control factor for highlight exposure screen trim. The operation of the computer illustrated in FIG. 19 is the same as that described relative to FIG. 18 except that an additional input signal is supplied from the highlight exposure screen trim potentiometer $P_{19}$ to the input of the exposure controller EC, which exposure controller supplies an output current to the meter M which is directly proportional to a scale reading of time.

Figure 20:
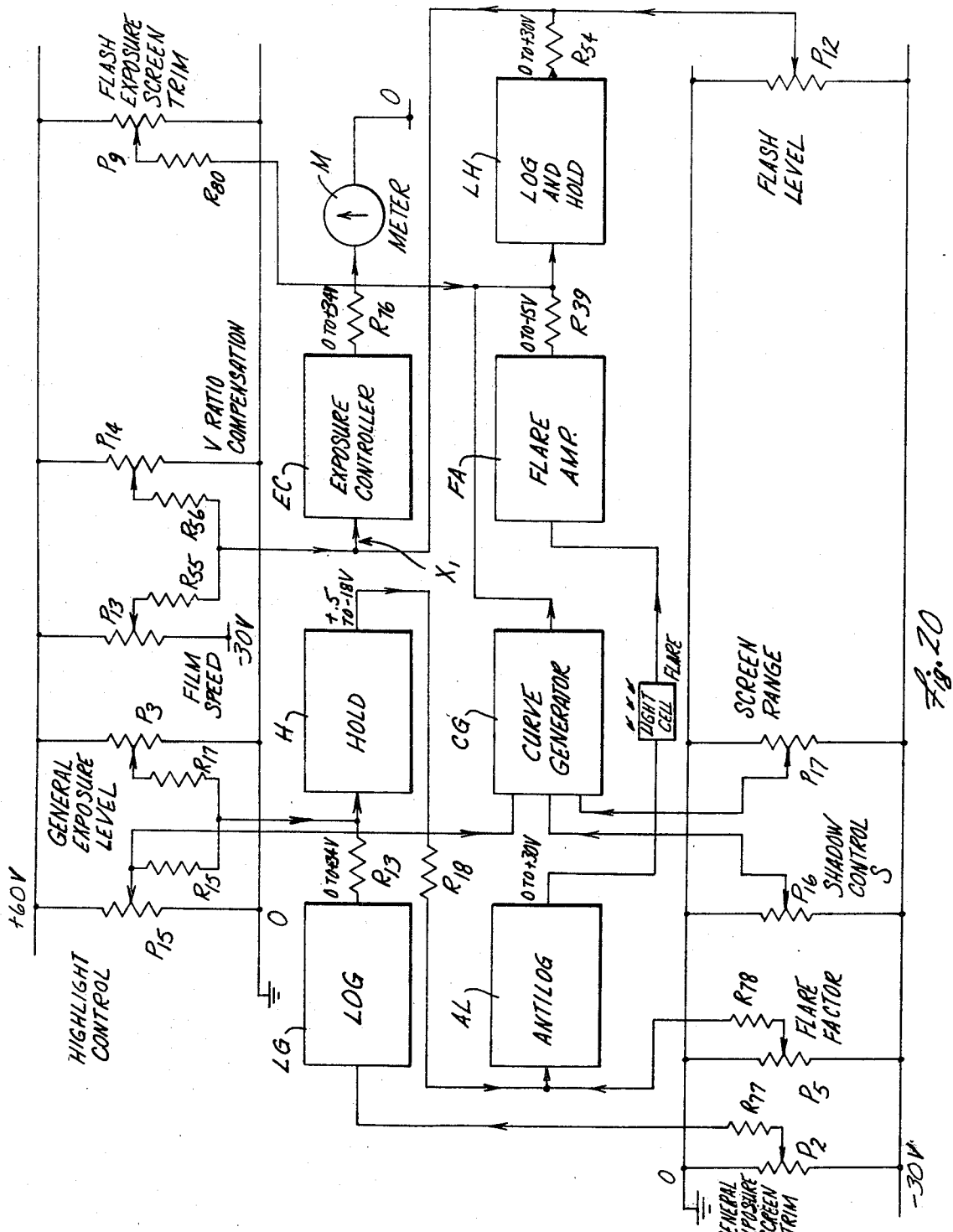

FIG. 20 diagrammatically illustrates therein the computer operation of a flash exposure. For a flash exposure numerous control potentiometers are provided and influence the computer operation. In particular, the control potentiometers provided are the highlight control $P_{15}$, general exposure level $P_3$, film speed $P_{15}$, V ratio compensation $P_{14}$, flash exposure screen trim $P_9$, general exposure screen trim $P_2$, flare factor $P_5$, shadow control $P_{16}$, screen range $P_{17}$ and flash level $P_{12}$. All of these control potentiometers are predetermined except for the highlight control $P_{15}$ and the shadow control $P_{16}$ which are altered for the particular film being utilized.

A signal from the general exposure screen trim $P_2$ is supplied as an input to the log function generator LG, which produces an output voltage of between zero and 34 volts. The output from the log function generator LG passes through the resistor $R_{13}$ and is summed with current supplied from the highlight control $P_{15}$ and the general exposure level $P_3$, which current summation is supplied to the hold circuit H. This total current supplied to the hold circuit represents the general exposure and is applied to the intergrating amplifier of the hold circuit H which provides an output signal is then supplied to the resistor $R_{18}$, which signal is then supplied to the antilog AL as an input, the current from the hold circuit being summed with a current signal from the flare factor $P_5$. The antilog circuit produces a logarithmic output which is proportional to the input, which output passes via a light cell to the input of the flare amplifier FA. The output from the flare amplifier is fed by a resistor $R_{39}$ to the input of the log and hold circuit LH.

Voltage signals from the highlight control $P_{15}$, the shadow control $P_{16}$ and the screen range $P_{17}$ are compared in the curve generator CG, which thus delivers a current output signal which is supplied to the input of the log and hold circuit LH. The flash exposure screen trim $P_9$ also delivers an input signal to the log and hold, whereupon the signals from the flash exposure screen trim $P_9$, the flare ampliefier FA and the curve generator CG are summed and supplied as an input signal to the log and hold circuit LH, which circuit LH results in an output voltage therefrom of between zero and 30 volts, the output of the log and hold circuit being proportional to a logarithm of the input supplied thereto.

The output voltage from the log and hold circuit is then supplied across a resistor $R_{54}$ to the exposure controller EC. The input to the exposure controller thus represents the output signal from the log and hold circuit LH, summed with the signals received from the film speed $P_{13}$, V ratio compensation $P_{14}$, and flash level $P_{12}$. The exposure controller produces an output voltage which when supplied to the meter M produces a current which is proportional to the required time.

To commence the exposure, the input to the exposure controller EC is removed and the controller, being an integrating amplifier with a controlled time delay, starts to reduce the output voltage, thereby reducing the time reading. At zero time, the exposure of the film is stopped.

The individual computer components as diagrammatically illustrated in FIGS. 18–20 will now be briefly considered.

Considering first the circuitry and operation of the exposure controller EC, the operation of this device is to supply a current which is proportional to exposure time, which current is applied to the meter M so as to display or register units of time in proportion to the current output of the exposure controller.

Particularly, when a signal is applied to the input $X_1$ (FIGS. 18–20 and 24) of the controller EC, the signal is supplied to the input of the amplifier $A_5$ by the input impedance $R_{62}$. Capacitor $C_6$ is then charged by resistance $R_{65}$. This causes a potential difference between the inputs of the differential amplifier $A_5$ whereupon a voltage output is obtained in correspondence to the input signal. The range of output volts from the amplifier $A_5$ and from the controller EC is from zero to 34 volts which, by a resistance $R_{76}$, allows an exposure time to be indicated on the meter in correspondence to the current.

To commence an "exposure time" cycle of the exposure controller EC, switch $S_1$ is closed. Since transistor $T_5$ is conducting inasmuch as diode $D_{29}$ is reversally biased, this causes transistor $T_6$ to conduct. Relay $R_A$ is then energized, whereupon relay contacts $R_{1A}$ close and contacts $R_{2A}$ open. This allows capacitor $C_1$ to discharge through the resistors $R_{65}$, $R_{64}$, the photo cell and resistor $R_{57}$. This will cause a change between the amplifier inputs, giving rise to a decreasing output voltage with respect to time. The rate of decrease in the output voltage is governed by the network $L_4$ which functions as the load for the amplifier $A_5$. The rate of decreasing output voltage from amplifier $A_5$ is determined by break points in the network $L_4$.

When the output voltage of amplifier $A_5$ falls to zero, transistor $T_5$ cuts off as diode $D_{29}$ is driven in conduction thereby removing the drive to transistor $T_6$ whereupon relay $R_A$ is de-energized, whereupon the relay contacts $R_{1A}$ open and $R_{2A}$ close. This point corresponds to zero units of time on the meter M and the circuit is now ready for initiation of another exposure time cycle.

Considering now the circuitry and operation of the log function generator LG (FIG. 21), a negative signal is supplied to the device LG by adjustment of the general exposure screen trim potentiometer $P_2$, which signal causes the amplifier $A_1$ to have an increase in the output voltage thereof. If the adjustment of the potentiometer $P_2$ is gradually taken negatively, this progressively increases the positive output voltage of the amplifier. When the output volts of the amplifier are low (or near zero), the input current is small, being controlled primarily by resistor $R_3$. Under these conditions the diodes $D_3$ and $D_4$ are reversally biased as the voltage at the anode of $D_3$, the diode with its anode at its greatest potential, is less than the cathode voltage, that is, less than the input voltage to the amplifier $A_1$.

As the amplifier output voltage increases such that the voltage at the junction of resistor $R_{10}$ and diode $D_5$ plus the voltage drop across diode $D_5$ is sufficient to cause diode $D_3$ to be forwardly biased, this allows more current to flow, via resistors $R_4$ and $R_5$ and diode $D_3$, into the input line. The total input current is thus the current through resistor $R_5$ and resistor $R_3$. Assuming that the gain of the amplifier $A_1$ is very large, then the current taken at the input terminal can be neglected. The above action takes place progressively as the output voltages rises until all of the diodes in the network $L_1$ are forwardly biased up to and including the last diode $D_7$ of the network.

Figure 21:
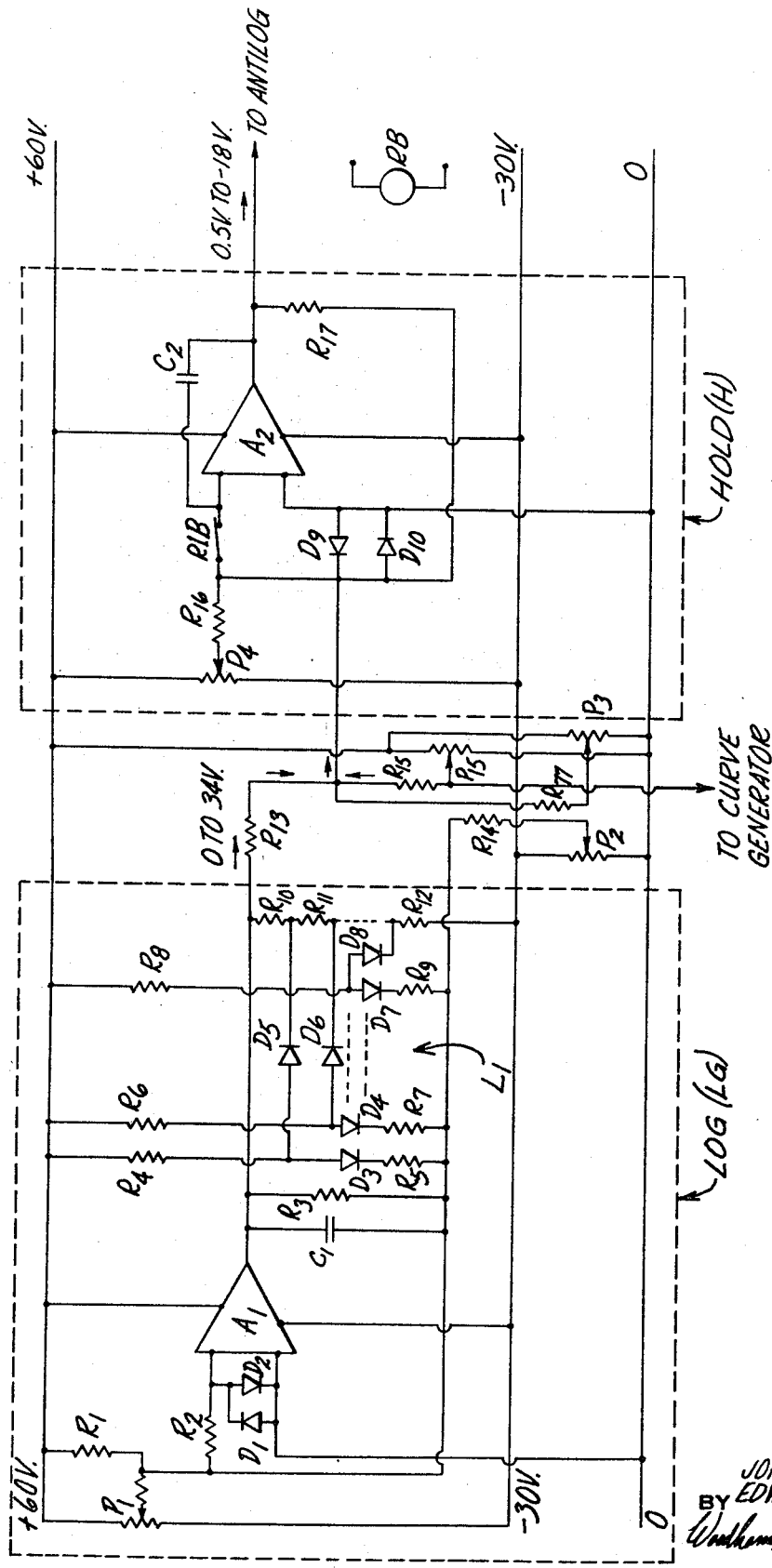

The hold circuit H is also illustrated in FIG. 21 and includes an amplifier $A_2$ which is based on an inverting amplifier such that when a positive input signal is applied thereto by adjustment of the potentiometers $P_4$, $P_{15}$, $P_3$, and the output voltage of log function generator LG, the output of the amplifier $A_2$ will be negative, and the voltage gain of the amplifier will be determined by the magnitude of the resistor $R_{17}$. The limitations of the output voltage from the amplifier are controlled by a Zener diode of 18 volts and thus the output voltage may range from plus 0.5 to minus 18 volts.

The operation of the hold relay $R_B$ occurs immediately prior to an exposure. Energization of the hold relay $R_B$ operates to maintain the hold relay contacts $R_{1B}$ in an open position. Owing to the charged feed-back capacitor $C_2$, the amplifier $A_2$ continues to supply the correct output voltage in correspondence to the input voltage previously submitted to the amplifier $A_2$ when the hold relay contacts $R_{1B}$ were closed. This enables a new setting or adjustment of the control potentiometers, such as $P_3$ and $P_{15}$, which potentiometers will be ready for the next sequence when the hold relay $R_B$ is deactivated and the hold relay contacts again close.

Figure 22:
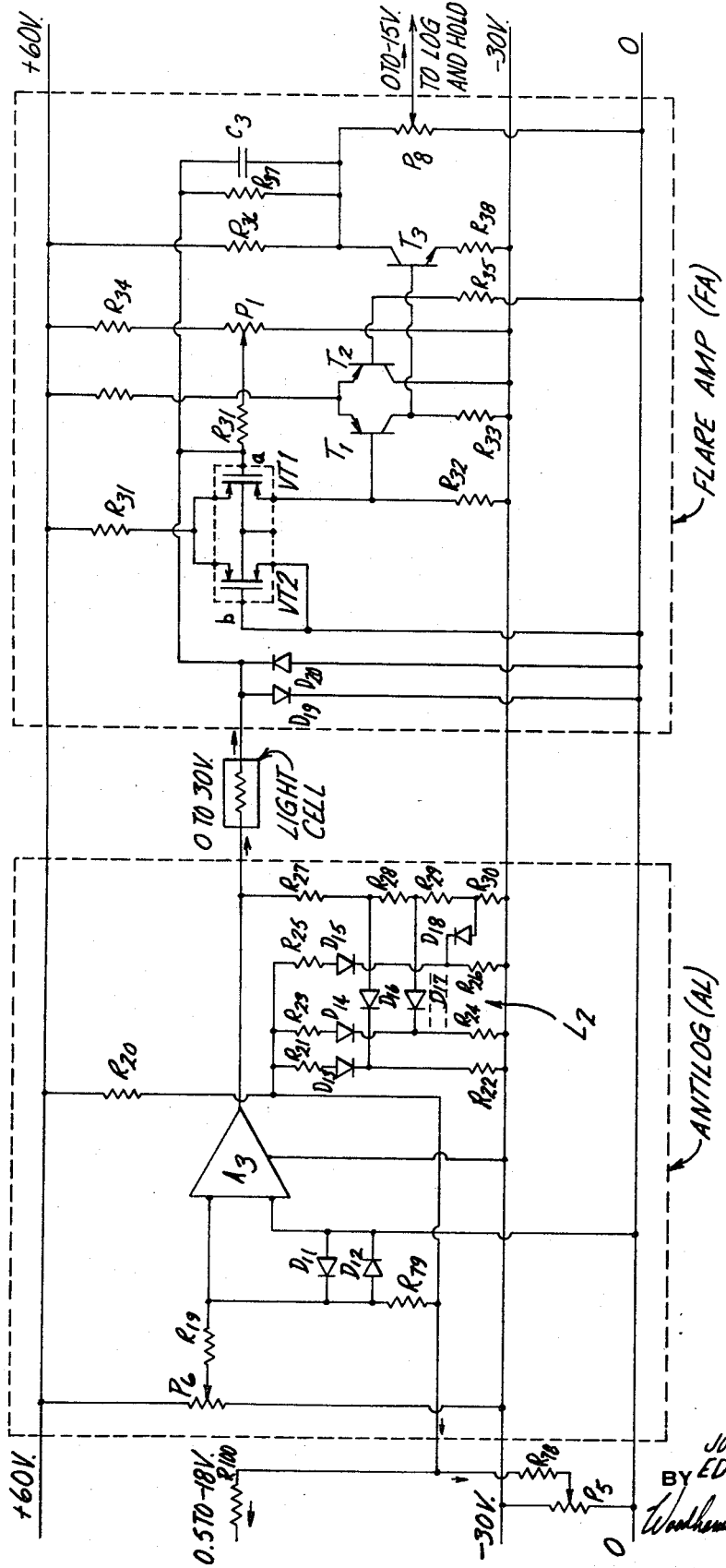

The antilog circuit AL (FIG. 22) includes an amplifier $A_3$ which receives an input signal which corresponds to the negative output signal from the hold circuit H. When the negative signal is applied to the input line, the current from the antilog network $L_2$ is a function of the output voltage of the amplifier $A_3$.

Considering the potentiometers $P_5$ and $P_6$, and the signal from the hold circuit H to be at zero volts, thereby having a zero output voltage, the current in the input line would be zero as the antilog network $L_2$ is in full conduction of current through the resistor $R_{20}$. For these conditions the diodes of the network $L_2$, such as $D_{16}$, $D_{17}$ and $D_{18}$, are always forwardly biased. The diodes $D_{13}$ through $D_{15}$ are in full conduction as $D_{13}$ is sufficiently forwardly biased by the potential determined at the junction of the diode $D_{16}$ and the resistor $R_{27}$, plus the voltage drop of diode $D_{16}$. As the potentiometer $P_5$ or signal from hold circuit H is taken negative, the output voltage of the amplifier $A_3$ increases causing an increase of current by diode $D_{16}$ and through resistor $R_{22}$. The potential now appearing at the junction of diode $D_{16}$ and resistor $R_{28}$ minus the voltage drop of diode $D_{16}$, has risen sufficiently that the cathode voltage of diode $D_{13}$ drives the diode into the cut-off state. The current from the input line thus increases due to the current which flows through resistor $R_{21}$. As the potentiometer $P_5$ or signal from hold circuit H is taken toward minus 30 volts, the amplifier output voltage increases thereby cutting off the diodes from $D_{13}$ through $D_{15}$ in turn. The current from the input line thereby increases owing to current which flows through the resistors $R_{21}$, $R_{23}$ and $R_{25}$.

The flare amplifier FA (FIG. 22) comprises a linear inverting D.C. amplifier with high input resistance and low drift. When the level potentiometer $P_7$ is set to produce a zero output voltage and the potentiometer $P_8$ is set to produce a maximum output voltage, and when the light sensing cell is in a dark operating state, the input signal is zero. As the light cell is gradually illuminated, current is allowed to flow into the transistor differential amplifier as comprised by the two M.O.S. transistors $VT_1$ and $VT_2$, which thus gives rise to an offset voltage between the gates $a$ and $b$ thereof. The offset voltage is positive on the gate $a$, and thus reduces the current from source to drain. The voltage across resistor $R_{32}$ is reduced, thereby driving transistor $T_1$ in further conduction, thereby creating more voltage across the resistor $R_{33}$. This allows transistor $T_3$ to conduct more current thereby increasing the voltage across resistor $R_{36}$ which drives the collector of transistor $T_3$ negative, thus allowing the output voltage to follow. As light intensity increases the resistance of the light cell attains a finite value, thereby positively increasing the input signal, given rise to a more negative output.

Figure 23:
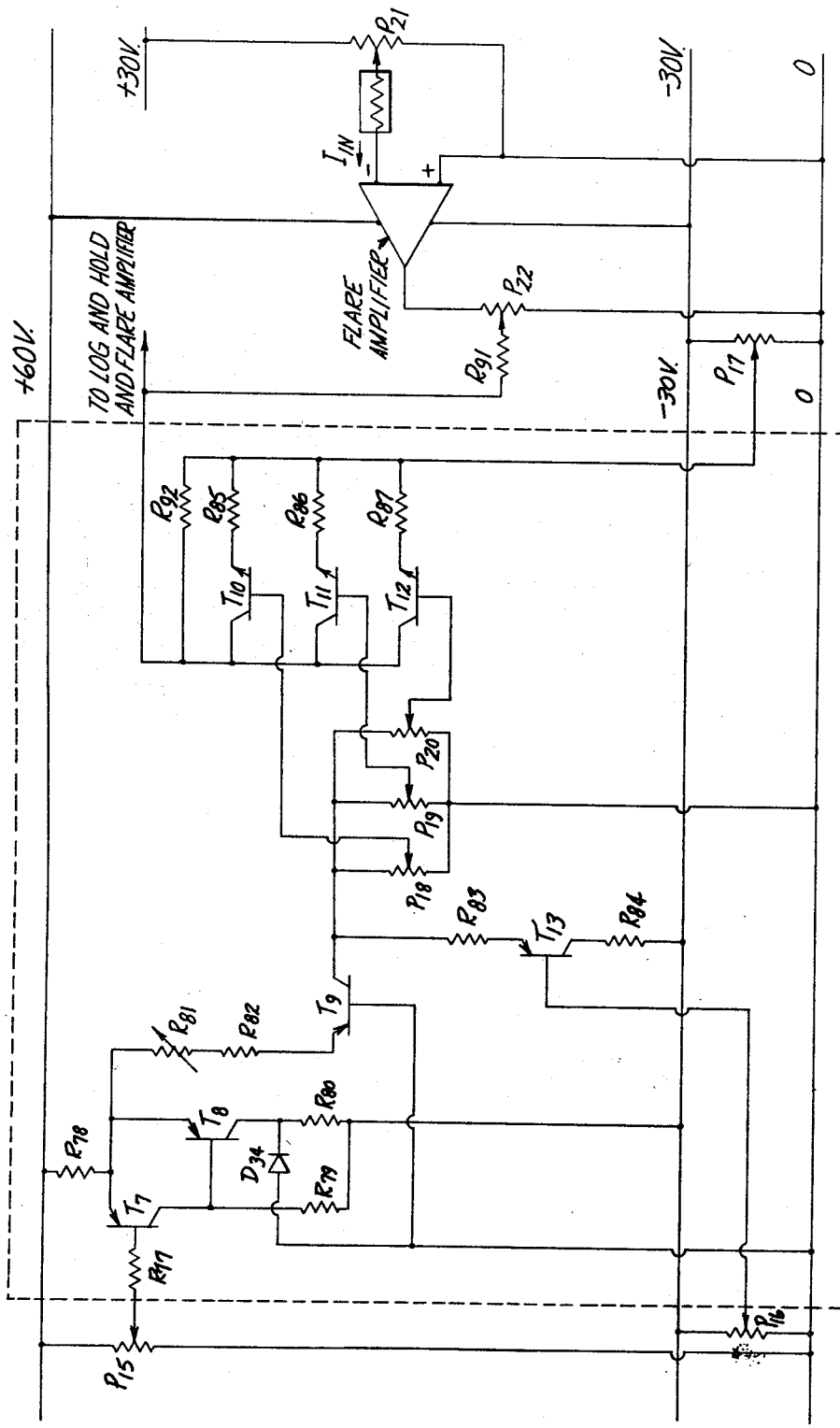

FIG. 23 illustrates therein the circuity for the curve generator CG. Consider the potentiometer $P_{16}$ set at a potential level between zero and 30 volts, and the potentiometer $P_{15}$ being set at zero potential. This potential is applied to the base of transistor $T_7$. The emitter voltage must be the base voltage plus the emitter to base voltage drop. Transistor $T_7$ is brought into full conduction. The base of transistor $T_8$ is driven positive thereby allowing the transistor to conduct heavily into resistor $R_{80}$. This continues until the collector of transistor $T_8$ tries to "cut off" transistor $T_7$, thereby trying to remove its own base drive. Equilibrium is now reached.

The voltage across potentiometer $R_{81}$, resistor $R_{82}$ and the emitter base junction of transistor $T_9$ is, as previously stated, the emitter voltage level of transistor $T_7$. As voltage must be constant with respect to zero, the current through $R_{81}$, $R_{82}$ and $T_9$ must be constant as the base of transistor $T_9$ is fixed at zero potential. If the collector volage of transistor $T_9$ is varied, the voltage change will appear across transistor $T_9$ and constant current will be delivered to resistor $R_{83}$.

If the potential of potentiometer $P_{16}$ is a fixed level, then current delivered from the collector of transistor $T_9$ is at a minimum when potentiometer $P_{15}$ is at zero potential. Voltage across resistor $R_{83}$ is negative and of small amplitude. Increase of potentiometer $P_{15}$ thus increases the collector current of transistor $T_9$, causing more volts to appear across resistor $R_{83}$. The difference between the set base voltage and collector voltage of transistor $T_{13}$ appears between emitter and collector (neglecting emitter to base drop). As the collector resistor $R_{84}$ is small, consider the collector voltage at 30 volts.

If potentiometer $P_{15}$ is constant and potentiometer $P_{16}$ voltage level is changed, the voltage across resistor $R_{83}$ remains unchanged but the voltage level at the collector of transistor $T_9$ reflects the change of potentiometer $P_{16}$ voltage level, the range of voltage being between zero to 17 volts. For correct operation potentiometer $P_{16}$ is fixed at a predetermined level and potentiometer $P_{15}$ is varied to obtain a required change of voltage.

The output line is of high impedance and approximately zero potential exists being the junction of resistors $R_{91}$, $R_{92}$ and the collectors of transistors $T_{10}$, $T_{11}$ and $T_{12}$.

A negative voltage level zero to 17 volts is applied to potentiometers $P_{18}$, $P_{19}$ and $P_{20}$. Three different voltage levls are applied to the bases of transistors $T_{10}$, $T_{11}$ and $T_{12}$ with transistor $T_{12}$ being at the lowest negative level. When an output incoming current is allowed to flow through resistor $R_{92}$ and the potentiometer $P_{21}$ is at a minimum, approximately zero volts, moving toward 30 volts, the output incoming current is a minimum (neglecting flare amplifier).

The voltage from potentiometer $P_{21}$ falls negatively until transistor $T_{10}$ is forward biased, the negative level being set by potentiometer $P_{20}$. This allows more current to flow into the output, as resistance $P_{85}$ and $R_{92}$ are now in parallel. Taking the potentiometer further negative causes transistor $T_{11}$ to conducting, making resistors $R_{92}$, $R_{85}$ and $R_{86}$ in parallel. Finally, when transistor $T_{12}$ is in conduction, resistors $R_{92}$, $R_{85}$, $R_{86}$ and $R_{87}$ are in parallel. Under this condition maximum current flows into output.

A nonlinear relation is produced in respect to the voltage level of potentiometer $P_{21}$ and the incoming output current.

Consider the flare linear amplifier in operation with a zero input signal and a zero output, then the extra current taken into the output line is zero. If the input signal is now introduced to give an output from the amplifier of 15 volts, then the output incoming current will increase accordingly through resistor $R_{91}$ and potentiometer $P_{22}$. If input to flare amplifier is of a nonlinear form the output incoming current into resistor $R_{91}$ will be in sympathy.

The relationship of the output incoming current to the circuit in full operational order will be a function of the flare amplifier input signal and the negative voltage level of potentiometer $P_{21}$, the effect of $P_{21}$ being arranged by the voltage level at the collector of transistor $T_9$, being a level at which potentiometers $P_{16}$ and $P_{15}$ were adjusted.

As mentioned above potentiometer $P_{16}$ was set at a predetermined level. The voltage at the collector of transistor $T_9$ is a direct linear relation to the change of voltage from potentiometer $P_{15}$. If $P_{15}$ is varied this will alter the total curve as all conduction points of transistors $T_{10}$, $T_{11}$ and $T_{12}$ will change about an axis shape approximately based on resistor $R_{92}$. In addition to the curve above, we have the nonlinear function of the flare amplifier current added to the above characteristic, making the total output incoming current.

FIG. 24 illustrates therein the circuitry for the log and hold LH, which is subjected to a negative input signal as received from the flare amplifier FA and curve generator CG. The current taken into the log network $L_3$ of the log and hold circuit LH is a function of the network and the output voltage from the amplifier $A_4$. If a signal to the input of amplifier $A_4$ is taken negatively, then the output voltage of the amplifier $A_4$ increases. As the potentiometer $P_{10}$ is adjusted negatively, this reduces the effect of the positive bias and the input current, which in turn increases the output voltage. Consider when the signal from the flare amplifier FA is zero volts and is gradually increasing negatively. In this condition, the bias current is now at a maximum, as caused by the potentiometer $P_9$. The amplifier voltage output is zero. For these conditions the diodes $D_{26}$ through $D_{28}$ in the network $L_3$ are always forward biased. The diodes $D_{23}$ through $D_{25}$ are in full conduction as diode $D_{23}$ is sufficiently forward biased by the potential determined at the junction of the diode $D_{26}$ and resistor $R_{50}$ plus the voltage drop over the diode $D_{26}$. As the signal from flare amplifier FA is taken negatively, the output voltage of amplifier $A_4$ increases causing a larger current to flow via diode $D_{26}$ and through resistor $R_{44}$, owing to the potential appearing at the junction diode $D_{26}$ and resistor $R_{51}$. The cathode potential has now increased sufficiently to cut off diode $D_{23}$. The effect of the total input current being is that the current which flows through resistor $R_{43}$ has now been substracted from the input current. As the signal from flare amplifier FA is taken further negative, the output voltage again increases and cuts off diode $D_{24}$ due to the increased potential across resistor $R_{46}$. If the signal from flare amplifier FA is taken negative until diode $D_{25}$ ceases to conduct, the input current will tend toward zero, which zero current occurs when the current in resistor $R_{47}$ is substantially equal to the current in resistor $R_{42}$.

The operation of the hold relay $R_B$ (FIG. 21) occurs immediately prior to an exposure. This operation causes the hold relay contacts $R_{2B}$ (FIG. 24) to open. Owing to the charge feedback from capacitor $C_4$, the amplifier $A_4$ continues to supply the correct output voltage in correspondence to the input voltage previously submitted to the amplifier when the hold relay contacts $R_{2B}$ were closed. This enables new settings for the potentiometer $P_9$ and flare amplifier FA output to be made, when the hold relay $R_B$ is deactivated, whereupon the circuit is ready for the next sequence.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A reproduction camera comprising a stationary copy holder, a first movable carriage and a multi-lens system mounted thereon, a second movable carriage and means thereon for positioning photosensitive material for exposure, said carriages being carried on a horizontal beam supported on anti-vibration mountings and each being movable independently and relative to the copy holder, a lens focusing mechanism, a lens aperture adjusting mechanism and means for selecting the lens to be used and for automatically adjusting same, sequence control means for controlling the various stages of the photographing operation, and a control panel disposed at one end of the camera from which an operator can control the photographic operations of the camera.

2. A camera according to claim 1, in which said control panel is adjacent said copy holder.

3. A camera according to claim 1, in which the lens system includes rotary solenoids for controlling the lens shutter mechanism.

4. A camera according to claim 1, in which the sequence control means includes solid state switching means.

5. A camera according to claim 1, in which the photosensitive material comprises film mounted in cassettes.

6. A camera according to claim 1, in which the photosensitive material comprises a plurality of rolls of film carried on rollers in a common light tight chamber.

7. A camera according to claim 1, including a platen and suction means for holding photosensitive film for exposure in contact with the face of the platen.

8. A camera according to claim 1, including means for effecting image reversal.

9. A camera according to claim 1, in which the first carriage is supported on rollers from an overhead track provided on said beam and is moved along the track by a motorized drive.

10. A camera according to claim 1, further including means for effecting illumination of the copy comprising lamps contained in a light tight and ventilated chamber.

11. A camera according to claim 10, in which an extendable bellows unit is provided between the first carriage and the light tight chamber for enclosing the lens system and for sealing said lamp containing chamber to said first carriage.

12. A camera according to claim 1, in which the second carriage is suspended on rollers from an overhead track provided on said beam and is moved along the track by a motorized drive.

13. A camera according to claim 1, in which said first and second carriages are connected by an extendable bellows unit which encloses the optical path in a light tight cover.

14. A camera according to claim 1, further including an electrical analogue focusing system for automatically positioning said carriages for operation according to the required conjugate focusing.

15. A camera according to claim 1, further including electronic control means by which copy density, copy contrast, required negative characteristics, film emulsion characteristics, aperture ratio and screen factors are pre-programmed and signals representing the light intensity are obtained automatically from transducers.

16. A camera according to claim 1, in which the lens aperture adjusting mechanism comprises a ratio lever, one end of which is pivoted and the other end of which rests on a cam having motorized setting means, lateral movement of the lever being proportional to the lens-image distance.

17. A camera according to claim 1, including a film feed mechanism having a film drive roller provided with a movable ring, the presence of film beneath said drive roller causing said ring to roll around said drive roller and thus actuate a switch to complete a circuit.

18. A reproduction camera comprising a copy holder, a first carriage having a lens system thereon, a second carriage and means thereon for positioning photosensitive material for exposure, drive means for permitting relative movement between said copy holder and said first and second carriages, sequence control means for controlling the various stages of the photographing operation, and electronic computer means for automatically compensating for screen, film and light characteristics, said computer means including means for supplying a signal in proportion to highlight control, general exposure level, film speed, aperture ratio and general exposure screen trim, said computer means further including exposure control circuitry means responsive to the input signal supplied thereto for producing an output signal proportional to exposure time.

19. A reproduction camera comprising a copy holder, a first carriage having a lens system thereon, a second carriage and means thereon for positioning photosensitive material for exposure, drive means for permitting relative movement between said copy holder and said first and second carriages, sequence control means for controlling the various stages of the photographing operation, and electronic computer means for automatically compensating for screen, film and light characteristics, said computer means including means for producing a signal in proportion to flare control shadow control, screen range and flash level.

20. A camera according to claim 1, in which the stationary copy holder is carried on said horizontal beam.

References Cited
UNITED STATES PATENTS

| | | | |
|---|---|---|---|
| 3,315,561 | 4/1967 | Boutique | 355—57 X |
| 3,335,636 | 8/1967 | Atkinson | 355—27 |

JOSEPH F. PETERS, JR., Primary Examiner

R. A. WINTERCORN, Assistant Examiner

U.S. Cl. X.R.

355—60, 67, 68